United States Patent
Li et al.

(10) Patent No.: US 9,290,647 B2
(45) Date of Patent: *Mar. 22, 2016

(54) ARTICLES INCLUDING A COMPATIBILIZED POLYPROPYLENE AND POLYLACTIC ACID BLEND

(71) Applicant: FINA TECHNOLOGY, INC., Houston, TX (US)

(72) Inventors: Fengkui Li, Houston, TX (US); Tim J. Coffy, Houston, TX (US); Michel Daumerie, Houston, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 46 days.

This patent is subject to a terminal disclaimer.

(21) Appl. No.: 14/253,535

(22) Filed: Apr. 15, 2014

(65) Prior Publication Data

US 2014/0228517 A1 Aug. 14, 2014

Related U.S. Application Data

(63) Continuation of application No. 12/165,051, filed on Jun. 30, 2008, now Pat. No. 8,759,446.

(51) Int. Cl.

| | | |
|---|---|---|
| *C08L 23/12* | (2006.01) | |
| *C08L 23/10* | (2006.01) | |
| *B29C 45/00* | (2006.01) | |
| *B29C 47/00* | (2006.01) | |
| *B29C 49/00* | (2006.01) | |
| *B29C 51/00* | (2006.01) | |
| *C08L 23/08* | (2006.01) | |
| *C08L 33/06* | (2006.01) | |
| *C08L 51/06* | (2006.01) | |
| *C08L 67/04* | (2006.01) | |

(52) U.S. Cl.
CPC ............. *C08L 23/12* (2013.01); *B29C 45/0001* (2013.01); *B29C 47/0004* (2013.01); *B29C 49/0005* (2013.01); *B29C 51/002* (2013.01); *C08L 23/10* (2013.01); *C08L 23/0884* (2013.01); *C08L 33/068* (2013.01); *C08L 51/06* (2013.01); *C08L 67/04* (2013.01); *C08L 2205/02* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 2,178,104 A | 10/1939 | Kline et al. | |
| 4,029,876 A | 6/1977 | Beatty et al. | |
| 5,216,050 A * | 6/1993 | Sinclair | 524/108 |
| 6,028,146 A * | 2/2000 | Kotlar et al. | 525/242 |
| 2002/0198332 A1* | 12/2002 | Kasemura et al. | 525/450 |
| 2008/0076880 A1* | 3/2008 | Nakagawa et al. | 525/190 |
| 2009/0264591 A1* | 10/2009 | Sano et al. | 525/93 |

FOREIGN PATENT DOCUMENTS

WO WO 2008/023758 * 2/2008

OTHER PUBLICATIONS

Chawla, Journal of Applied Polymer Science, vol. 105, Issue 6, p. 3578-3587, (2007).*

* cited by examiner

*Primary Examiner* — Robert C Boyle
(74) *Attorney, Agent, or Firm* — Albert Shung

(57) ABSTRACT

A composition comprising a blend of a polyolefin, polylactic acid, and a reactive modifier. A method of producing an oriented film comprising reactive extrusion compounding a mixture comprising polypropylene, polylactic acid, a reactive modifier to form a compatibilized polymeric blend, casting the compatibilized polymeric blend into a film, and orienting the film. A method of preparing a reactive modifier comprising contacting a polyolefin, a multifunctional acrylate comonomer, and an initiator under conditions suitable for the formation of an epoxy-functionalized polyolefin wherein the epoxy-functionalized polyolefin has a grafting yield of from 0.2 wt. % to 15 wt. %.

17 Claims, 13 Drawing Sheets

FIG. 4
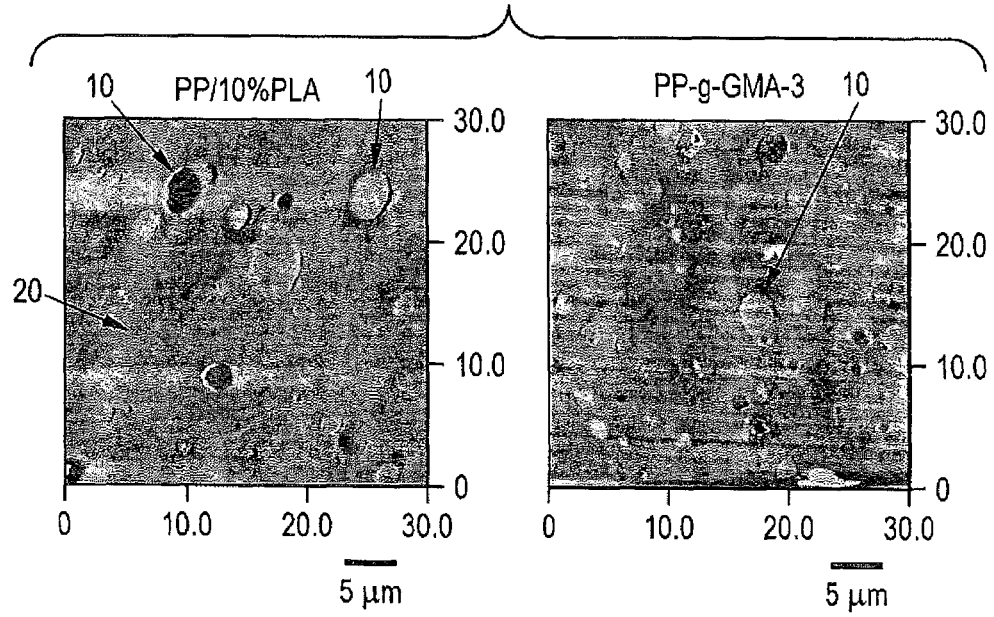
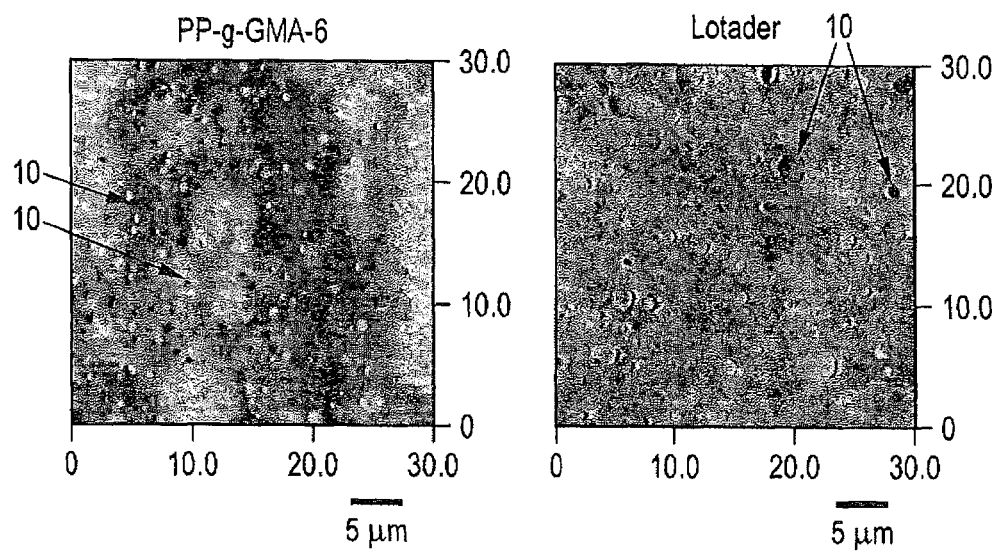

ARTICLES INCLUDING A COMPATIBILIZED POLYPROPYLENE AND POLYLACTIC ACID BLEND

CROSS-REFERENCE TO RELATED APPLICATIONS

This application is a Continuation of U.S. application Ser. No. 12/165,051, filed on Jun. 30, 2008.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Technical Field

This disclosure relates to polymeric blends. More specifically, this disclosure relates to polymeric compositions comprising a biodegradable polymer.

2. Background

Synthetic polymeric materials, such as polypropylene and polyethylene resins, are widely used in the manufacturing of a variety of end-use articles ranging from medical devices to food containers. Many industries, such as the packaging industry, utilize polypropylene materials in various manufacturing processes to create a variety of finished goods including biaxially oriented polypropylene (BOPP) films.

While articles constructed from synthetic polymeric materials have widespread utility, one drawback to their use is that these materials tend to remain semi-permanently in a natural environment. In response to environmental concerns, interest in the production and utility of more readily biodegradable polymeric materials has been increasing. These materials, also known as "green materials", may undergo accelerated degradation in a natural environment. The utility of these biodegradable polymeric materials is often limited by their poor mechanical and/or physical properties. Thus, a need exists for biodegradable polymeric compositions having desirable physical and/or mechanical properties.

SUMMARY

Disclosed herein is a composition comprising a blend of a polyolefin, polylactic acid, and a reactive modifier.

Also disclosed herein is a method of producing an oriented film comprising reactive extrusion compounding a mixture comprising polypropylene, polylactic acid, a reactive modifier to form a compatibilized polymeric blend, casting the compatibilized polymeric blend into a film, and orienting the film.

Further disclosed herein is a method of preparing a reactive modifier comprising contacting a polyolefin, a multifunctional acrylate comonomer, and an initiator under conditions suitable for the formation of an epoxy-functionalized polyolefin wherein the epoxy-functionalized polyolefin has a grafting yield of from 0.2 wt. % to 15 wt. %.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 4 shows atomic force microscopy pictures of the samples from Example 2.

DETAILED DESCRIPTION

Figure 1:
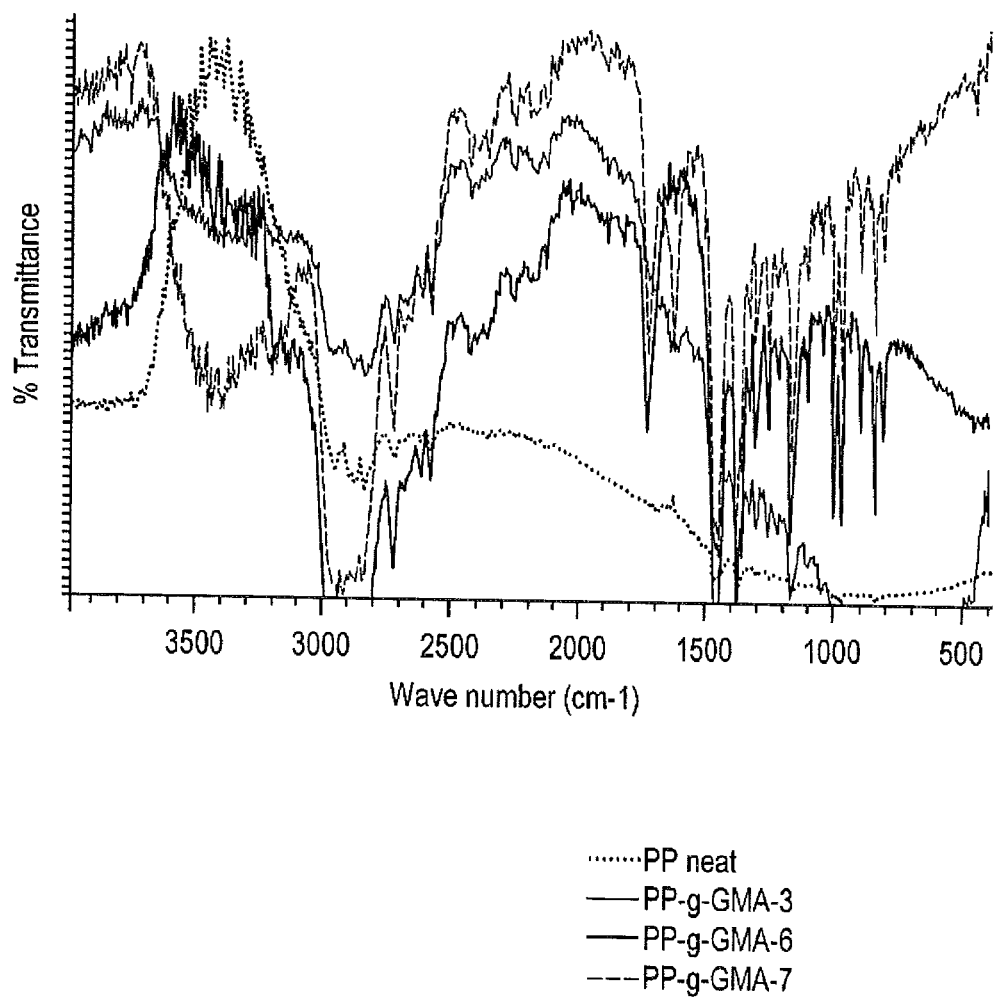
FIGS. 1 and 2 are Fourier Transform Infrared Spectroscopy (FTIR) spectra for the samples from Example 1.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are biodegradable polymeric compositions and methods of making and using same. Herein biodegradable polymeric compositions comprise materials that are capable of being broken down especially into innocuous products by the action of living things In an embodiment, the biodegradable polymeric compositions comprise polylactic acid, polypropylene, and at least one reactive modifier and is referred to as a compatiblized PP/PLA blend (CB). In an alternative embodiment, the polymeric composition comprises polylactic acid, polyethylene, and at least one reactive modifier and is referred to as a compatibilized polyethylene blend (CPEB).

A method of preparing the CB and/or CPEB may comprise the concurrent blending of the reactive modifier with a polyolefin (e.g., polypropylene or polyethylene) and polylactic acid under conditions suitable for the formation of a blended material. CBs and/or CPEBs of the type described herein may display desirable physical and/or mechanical properties when compared to either the polyolefin or polylactic acid alone, or to an uncompatibilized blend of the polyolefin and polylactic acid.

In an embodiment, the CB comprises polypropylene. The polypropylene may be a homopolymer provided however that the homopolymer may contain up to 5% of another alpha-olefin, including but not limited to $C_2$-$C_8$ alpha-olefins such as ethylene and 1-butene. Despite the potential presence of small amounts of other alpha-olefins, the polypropylene is generally referred to as a polypropylene homopolymer.

In an embodiment, the polypropylene homopolymer is present in the CB in an amount of from 51 weight percent (wt. %) to 99 wt. % by total weight of the CB, alternatively from 70 wt. % to 95 wt. %, alternatively from 80 wt. % to 90 wt. %.

Polypropylene homopolymers suitable for use in this disclosure may include any type of polypropylene known in the art with the aid of this disclosure. For example, the polypropylene homopolymer may be atactic polypropylene, isotactic polypropylene, hemi-isotactic, syndiotactic polypropylene, or combinations thereof. A polymer is "atactic" when its pendant groups are arranged in a random fashion on both sides of the chain of the polymer. In contrast, a polymer is "isotactic" when all of its pendant groups are arranged on the same side of the chain and "syndiotactic" when its pendant groups alternate on opposite sides of the chain. In hemi-isotactic polymer, every other repeat unit has a random substituent.

In an embodiment, a polypropylene suitable for use in this disclosure may have a density of from 0.895 g/cc to 0.920 g/cc, alternatively from 0.900 g/cc to 0.915 g/cc, and alternatively from 0.905 g/cc to 0.915 g/cc as determined in accordance with ASTM D1505; a melting temperature of from 150° C. to 170° C., alternatively from 155° C. to 168° C., and alternatively from 160° C. to 165° C. as determined by differential scanning calorimetry; a melt flow rate of from 0.5 g/10 min. to 30 g/10 min., alternatively from 1.0 g/10 min. to 15 g/10 min., and alternatively from 1.5 g/10 min. to 5.0 g/10 min. as determined in accordance with ASTM D1238 condition "L"; a tensile modulus of from 200,000 psi to 350,000 psi; alternatively from 220,000 psi to 320,000 psi, and alternatively from 250,000 psi to 320,000 psi as determined in accordance with ASTM D638; a tensile stress at yield of from 3,000 psi to 6,000 psi, alternatively from 3,500 psi to 5,500 psi, and alternatively from 4,000 psi to 5,500 psi as determined in accordance with ASTM D638; a tensile strain at yield of from 5% to 30%, alternatively from 5% to 20%, and alternatively from 5% to 15% as determined in accordance with ASTM D638; a flexural modulus of from 120,000 psi to 330,000 psi, alternatively from 190,000 psi to 310,000 psi, and alternatively of from 220,000 psi to 300,000 psi as determined in accordance with ASTM D790; a Gardner impact of from 3 in-lb to 50 in-lb, alternatively from 5 in-lb to 30 in-lb, and alternatively from 9 in-lb to 25 in-lb as determined in accordance with ASTM D2463; a Notched Izod Impact Strength of from 0.2 ft lb/in to 20 ft lb/in, alternatively from 0.5 ft lb/in to 15 ft lb/in, and alternatively from 0.5 ft lb/in to 10 ft lb/in as determined in accordance with ASTM D256A; a hardness shore D of from 30 to 90, alternatively from 50 to 85, and alternatively from 60 to 80 as determined in accordance with ASTM D2240; and a heat distortion temperature of from 50° C. to 125° C., alternatively from 80° C. to 115° C., and alternatively from 90° C. to 110° C. as determined in accordance with ASTM D648.

Examples of polypropylene homopolymers suitable for use in this disclosure include without limitation 3371, 3271, 3270, and 3276, which are polypropylene homopolymers commercially available from Total Petrochemicals USA, Inc. In an embodiment, the polypropylene homopolymer (e.g., 3371) has generally the physical properties set forth in Table 1.

TABLE 1

| Properties | 3371 Typical Value | Test Method |
|---|---|---|
| Physical | | |
| Density, g/cc | 0.905 | ASTM D1505 |
| Melt Flow Rate (MFR), g/10 min. | 2.8 | ASTM D1238 condition "L" |
| Mechanical | | |
| Tensile Modulus, psi | 235,000 | ASTM D638 |
| Tensile Stress at Yield, psi | 5,100 | ASTM D638 |
| Tensile Strain at Yield, % | 7.5 | ASTM D638 |
| Flexural Modulus, psi | 202,000 | ASTM D790 |
| Impact | | |
| Gardner impact, in-lb | 149.2 | ASTM D2463 |
| Notched Izod Impact Strength, ft lb/in | 0.69 | ASTM D256A |
| Hardness | | |
| Hardness Shore D | 75 | ASTM D2240 |
| Thermal | | |
| Heat distortion temperature, ° F. | 207 | ASTM D648 |
| Melting Temperature (DSC), ° F. | 325 | DSC |

In another embodiment, the polypropylene may be a high crystallinity polypropylene homopolymer (HCPP). The HCPP may contain primarily isotactic polypropylene. The isotacticity in polymers may be measured via $^{13}C$ NMR spectroscopy using meso pentads and can be expressed as percentage of meso pentads (% mmmm). As used herein, the term "meso pentads" refers to successive methyl groups located on the same side of the polymer chain. In an embodiment, the HCPP has a meso pentads percentage of greater than 97%, or greater than 98%, or greater than 99%. The HCPP may comprise some amount of atactic or amorphous polymer. The atactic portion of the polymer is soluble in xylene, and is thus termed the xylene soluble fraction (XS %). In determining XS %, the polymer is dissolved in boiling xylene and then the solution cooled to 0° C. that results in the precipitation of the isotactic or crystalline portion of the polymer. The XS % is that portion of the original amount that remained soluble in the cold xylene. Consequently, the XS % in the polymer is indicative of the extent of crystalline polymer formed. The total amount of polymer (100%) is the sum of the xylene soluble fraction and the xylene insoluble fraction, as determined in accordance with ASTM D5492-98. In an embodiment, the HCPP has a xylene soluble fraction of less than 1.5%, or less than 1.0%, or less than 0.5%.

In an embodiment, an HCPP suitable for use in this disclosure may have a density of from 0.895 g/cc to 0.920 g/cc, alternatively from 0.900 g/cc to 0.915 g/cc, and alternatively from 0.905 g/cc to 0.915 g/cc as determined in accordance with ASTM D1505; a melt flow rate of from 0.5 g/10 min. to 30 g/10 min., alternatively from 1.0 g/10 min. to 15 g/10 min., and alternatively from 1.5 g/10 min. to 5.0 g/10 min. as determined in accordance with ASTM D1238; a secant modulus in the machine direction (MD) of from 350,000 psi to 420,000 psi; alternatively from 380,000 psi to 420,000 psi, and alternatively from 400,000 psi to 420,000 psi as determined in accordance with ASTM D882; a secant modulus in the transverse direction (TD) of from 400,000 psi to 700,000 psi, alternatively from 500,000 psi to 700,000 psi, and alternatively from 600,000 psi to 700,000 psi as determined in accordance with ASTM D882; a tensile strength at break in the MD of from 19,000 psi to 28,000 psi, alternatively from 22,000 psi to 28,000 psi, and alternatively from 25,000 psi to 28,000 psi as determined in accordance with ASTM D882; a tensile strength at break in the TD of from 20,000 psi to 40,000 psi, alternatively from 30,000 psi to 40,000 psi, and alternatively of from 35,000 psi to 40,000 psi as determined in accordance with ASTM D882; an elongation at break in the MD from 50% to 200%, alternatively from 100% to 180%, and alternatively from 120% to 150% as determined in accordance with ASTM D882; an elongation at break in the TD of from 50% to 150%, alternatively from 60% to 100%, and alternatively from 80% to 100% as determined in accordance with ASTM D882; a melting temperature of from 150° C. to 170° C., alternatively from 155° C. to 170° C., and alternatively from 160° C. to 170° C. as determined by differential scanning calorimetry; a gloss at 45° of from 70 to 95, alternatively from 75 to 90, and alternatively from 80 to 90 as determined in accordance with ASTM D2457; a percentage haze of from 0.5% to 2.0%, alternatively from 0.5% to 1.5%, and alternatively from 0.5% to 1.0% as determined in accordance with ASTM D1003; and a water vapor transmission rate of from 0.15 to 0.30 g-mil/100 in$^2$/day, alternatively from 0.15 to 0.25 g-mil/100 in$^2$/day, and alternatively from 0.20 to 0.21 g-mil/100 in$^2$/day as determined in accordance with ASTM F1249-90.

An example of an HCPP suitable for use in this disclosure includes without limitation 3270, which is an HCPP commercially available from Total Petrochemicals USA, Inc. The HCPP (e.g., 3270) may generally have the physical properties set forth in Table 2.

TABLE 2

| Properties | 3270 Typical Value | Test Method |
|---|---|---|
| Physical | | |
| Density, g/cc | 0.910 | ASTM D1505 |
| Melt Mass-Flow Rate (MFR) (230° C./2.16 kg), g/10 min. | 2.0 | ASTM D1238 |
| BOPP Mechanical | | |
| Secant Modulus MD, psi | 420,000 | ASTM 882 |
| Secant Modulus TD, psi | 700,000 | ASTM 882 |
| Tensile Strength at Break MD, psi | 28,000 | ASTM 882 |
| Tensile Strength at Break TD, psi | 39,000 | ASTM 882 |
| Elongation at Break MD, % | 150 | ASTM 882 |
| Elongation at Break TD, % | 60 | ASTM 882 |
| Thermal | | |
| Melting Temperature, ° F. | 329 | DSC |
| Optical | | |
| Gloss (45°) | 85 | ASTM D2457 |
| Haze, % | 1.0 | ASTM D1003 |
| Barrier | | |
| Water Vapor Transmission, 100° F., 90% R.H, g-mil/100 in$^2$/day | 0.2 | ASTM F1249-90 |

In another embodiment, the polypropylene may be a polypropylene heterophasic copolymer (PPHC) wherein a polypropylene homopolymer phase or component is joined to a copolymer phase or component. The PPHC may comprise from greater than 6.5% to less than 11.5% by weight ethylene, alternatively from 8.5% to less than 10.5%, alternatively from 9.5% ethylene based on the total weight of the PPHC. Herein, percentages of a component refer to the percent by weight of that component in the total composition unless otherwise noted.

The copolymer phase of a PPHC may be a random copolymer of propylene and ethylene, also referred to as an ethylene/propylene rubber (EPR). PP impact copolymers show distinct homopolymer phases that are interrupted by short sequences or blocks having a random arrangement of ethylene and propylene. In comparison to random copolymers, the block segments comprising the EPR may have certain polymeric characteristics (e.g., intrinsic viscosity) that differ from that of the copolymer as a whole. Without wishing to be limited by theory, the EPR portion of the PPHC has rubbery characteristics which, when incorporated within the matrix of the homopolymer component, may function to provide increased impact strength to the PPHC. In an embodiment, the EPR portion of the PPHC comprises greater than 14 wt. % of the PPHC, alternatively greater than 18 wt. % of the PPHC, alternatively from 14 wt. % to 18 wt. % of the PPHC.

The amount of ethylene present in the EPR portion of the PPHC may be from 38 wt. % to 50 wt. %, alternatively from 40 wt. % to 45 wt. % based on the total weight of the EPR portion. The amount of ethylene present in the EPR portion of the PPHC may be determined spectrophotometrically using a Fourier transform infrared spectroscopy (FTIR) method. Specifically, the FTIR spectrum of a polymeric sample is recorded for a series of samples having a known EPR ethylene content. The ratio of transmittance at 720 cm$^{-1}$/900 cm$^{-1}$ is calculated for each ethylene concentration and a calibration curve may then be constructed. Linear regression analysis on the calibration curve can then be carried out to derive an equation that is then used to determine the EPR ethylene content for a sample material.

The EPR portion of the PPHC may exhibit an intrinsic viscosity different from that of the propylene homopolymer component. Herein intrinsic viscosity refers to the capability of a polymer in solution to increase the viscosity of said solution. Viscosity is defined herein as the resistance to flow due to internal friction. In an embodiment, the intrinsic viscosity of the EPR portion of the PPHC may be greater than 2.0 dl/g, alternatively from 2.0 dl/g to 3.0 Wig, alternatively from 2.4 dl/g to 3.0 dl/g, alternatively from 2.4 dl/g to 2.7 dl/g, alternatively from 2.6 dl/g to 2.8 dl/g. The intrinsic viscosity of the EPR portion of the PPHC is determined in accordance with ASTM D5225.

In an embodiment, the PPHC may have a melt flow rate (MFR) of from 65 g/10 min. to 130 g/10 min., alternatively from 70 g/10 min. to 120 g/10 min., alternatively from 70 g/10 min. to 100 g/10 min., alternatively from 70 g/10 min. to 90 g/10 min., alternatively from 75 g/10 min. to 85 g/10 min., alternatively 90 g/10 min. Excellent flow properties as indicated by a high MFR allow for high throughput manufacturing of molded polymeric components. In an embodiment, the PPHC is a reactor grade resin without modification, which may also be termed a low order PP. In some embodiments, the PPHC is a controlled rheology grade resin, wherein the melt flow rate has been adjusted by various techniques such as visbreaking. For example, MFR may be increased by visbreaking as described in U.S. Pat. No. 6,503,990, which is incorporated by reference in its entirety. As described in that publication, quantities of peroxide are mixed with polymer resin in flake, powder, or pellet form to increase the MFR of the resin. MFR as defined herein refers to the quantity of a melted polymer resin that will flow through an orifice at a specified temperature and under a specified load. The MFR may be determined using a dead-weight piston Plastometer that extrudes polypropylene through an orifice of specified dimensions at a temperature of 230° C. and a load of 2.16 kg in accordance with ASTM D1238.

Representative examples of suitable PPHCs include without limitation 4920W and 4920WZ, which are impact copolymer resins commercially available from Total Petrochemicals USA Inc. In an embodiment, the PPHC (e.g., 4920W) has generally the physical properties set forth in Table 3.

TABLE 3

| Properties | Typical Value | ASTM Method |
|---|---|---|
| Physical | | |
| Melt Flow, g/10 min. | 100 | D1238 |
| Density, g/cc | 0.905 | D1505 |
| Melting Point, ° C. | 160-165 | DSC |
| Mechanical | | |
| Tensile strength at Yield, psi (MPa) | 3700 (25) | D638 |
| Elongation at Yield, % | 6 | D638 |
| Flexural Modulus, psi (MPa) | 190,000 (1,300) | D790 |
| Notched-ft. lb./in. (J/m) | 1.0 (50) | ASTM D256A |
| Thermal | | |
| Heat Deflection, ° C. | 90 | D648 |

In an embodiment, the CPEB comprises polyethylene, alternatively high density polyethylene, alternatively low density polyethylene, alternatively linear low density polyethylene.

In an embodiment, the CPEB comprises high density polyethylene (HDPE). Herein an HDPE has a density of equal to or greater than 0.941 g/cc, alternatively from 0.941 g/cc to 0.965 g/cc, alternatively from 0.945 g/cc to 0.960 g/cc. The HDPE may be a homopolymer or a copolymer, for example a copolymer of ethylene with one or more alpha-olefin monomers such as propylene, butene, hexene, etc. In an embodiment, the HDPE is a homopolymer. An HDPE suitable for use in this disclosure may generally have a melt-mass flow rate, determined by ASTM D1238, of from 0.01 g/10 min. to 50 g/10 min., or from 0.5 g/10 min. to 20 g/10 min., or from 1.0 g/10 min. to 10 g/10 min. In an embodiment, an HDPE suitable for use in this disclosure may generally have a tensile modulus, determined by ASTM D638, of from 100,000 psi to 350,000 psi, or from 150,000 psi to 300,000 psi, or from 180,000 psi to 220,000 psi. In an embodiment, an HDPE suitable for use in this disclosure may generally have a flexural modulus, determined by ASTM D790, of from 30,000 psi to 350,000 psi, or from 100,000 psi to 300,000 psi, or from 150,000 psi to 200,000 psi. In an embodiment, an HDPE suitable for use in this disclosure may generally have a melting temperature, determined by differential scanning calorimetry (DSC), of from 120° C. to 140° C., or from 125° C. to 135° C., or from 130° C. to 133° C.

Examples of HDPEs suitable for use in this disclosure include without limitation 6450 HDPE which is a polyethylene resin and mPE ER 2283 POLYETHYLENE which is a metallocene high density polyethylene resin with hexene as comonomer, both are commercially available from Total Petrochemicals USA, Inc. In an embodiment, a suitable HDPE has generally the physical properties set forth in Table 4 (e.g., 6450 HDPE) or Table 5 (e.g., ER 2283).

TABLE 4

| Properties | Typical Value | ASTM Method |
|---|---|---|
| Resin[1] | | |
| Melt Flow Index 190° C./2.16 kg, g/10 min | 5.0 | D 1238 |
| Density, g/cm³ | 0.962 | D 792 |
| Melting Point, ° F. | 265 | D 3417 |
| Film[1][2] | | |
| Haze, % | 5.0 | D 1003 |
| Gloss, % | 85 | D 523 |
| Tensile Strength @ Break (MD), psi | 3500 | D 882 |

TABLE 4-continued

| Properties | Typical Value | ASTM Method |
|---|---|---|
| Tensile Strength @ Break (TD), psi | 3800 | D 882 |
| Elongation @ Break (MD), % | 850 | D 882 |
| Elongation @ Break (TD), % | 650 | D 882 |
| Secant Modulus @ 2% Strain (MD), psi | 100,000 | D 882 |
| Secant Modulus @ 2% Strain (TD), psi | 130,000 | D 882 |
| WVTR[3] @ 100° F., g/100 in²/day | 0.5 | E 96/66 |
| Low Temp. Brittleness, ° F. | <−112 | D 746 |

[1]Data developed under laboratory conditions and are not to be used as specification, maxima or minima.
[2]The data listed were determined on 1.0 mil cast film.
[3]Water Vapor Transmission Rate.

TABLE 5

| Properties | Method | Unit | Value |
|---|---|---|---|
| Physical | | | |
| Density | ISO 1183 | g/cm³ | 0.950 |
| Melt Index (2.16 kg) | ISO 1133 | g/10 min | 2.0 |
| Melting Point | EN ISO 11357 | ° C. | 133 |
| Vicat Temperature | ISO 306 | ° C. | 130 |
| Cast Film | | | |
| Dart Impact | ISO 7765-1 | g | 36 |
| Tensile Strength at Yield MD/TD | ISO 527-3 | MPa | 23/24 |
| Tensile Strength at Break MD/TD | ISO 527-3 | MPa | 43/41 |
| Elongation at Break MD/TD | ISO 527-3 | % | 640/820 |
| Elmendorf MD/TD | ISO 6393 | N/mm | 8/130 |
| Haze | ISO 14782 | % | 10 |
| Gloss 45° | ASTM D2457 | | 68 |

In an embodiment, the CPEB comprises a low density polyethylene (LDPE). Herein an LDPE is defined as having a density range of from 0.910 g/cm³ to 0.940 g/cm³, alternatively from 0.917 g/cm³ to 0.935 g/cm³, and alternatively from 0.920 g/cm³ to 0.930 g/cm³. The LDPE may be further characterized by the presence of increased branching when compared to an HDPE. The LDPE may be a homopolymer or a copolymer, for example a copolymer of ethylene with one or more alpha-olefin monomers such as propylene, butene, hexene, etc. In an embodiment, the LDPE is a homopolymer. An LDPE suitable for use in this disclosure may generally have a melt-mass flow rate, determined by ASTM D1238, of from 0.1 g/10 min. to 60 g/10 min., or from 0.5 g/10 min. to 30 g/10 min., or from 1 g/10 min. to 20 g/10 min. In an embodiment, an LDPE suitable for use in this disclosure may generally have a tensile modulus, determined by ASTM D638, of from 10,000 psi to 70,000 psi, or from 15,000 psi to 65,000 psi, or from 20,000 psi to 60,000 psi. In an embodiment, an LDPE suitable for use in this disclosure may generally have a flexural modulus, determined by ASTM D790, of from 9,000 psi to 60,000 psi, or from 10,000 psi to 55,000 psi, or from 15,000 psi to 50,000 psi. In an embodiment, an LDPE suitable for use in this disclosure may generally have a melting temperature, determined by differential scanning calorimetry (DSC), of from 85° C. to 125° C., or from 90° C. to 120° C., or from 95° C. to 120° C.

A representative example of a suitable LDPE is 1020 FN 24, which is an LDPE commercially available from Total Petrochemicals USA, Inc. The LDPE (e.g., 1020 FN 24) may generally have the physical properties set forth in Table 6.

TABLE 6

|  | English | SI | Method |
|---|---|---|---|
| Nominal Physical Properties | | | |
| Density | — | 0.922 g/cm³ | ASTM D1505 |
| Melt Index, 190° C./2.16 Kg | — | 2.1 g/10 min | ASTM D1238 |
| Melting Point | 232° F. | 109° C. | ASTM D3418 |
| Vicat Softening Temperature | 209° F. | 94° C. | ASTM D1525 |
| Nominal Blown Film Properties at 40 um[1] | | | |
| Haze | 7.0% | 7.0% | ASTM D1003 |
| Tensile Strength at Yield MD/TD | 1595 psi/1523 psi | 11 MPa/10.5 MPa | ISO 527-3 |
| Tensile Strength at Break MD/TD | 4061 psi/3190 psi | 28/22 MPa | ISO 527-3 |
| Elongation at Break MD/ID | 360%/630% | 360%/630% | ISO 527-3 |
| Elmendorf MD/TD | — | 75/45 N/mm | ISO 6383-2 |
| Dart test | — | 120 g | ISO 7765-1 |
| Haze | 7% | 7% | ISO 14782 |

[1]Data are obtained using laboratory test specimens produced with the following extrusion conditions: 45 mm screw diameter, L/D = 30, die diameter = 120 mm, die gap = 1.4 mm, BUR = 2.5:1, temperature = 185° C.

In an embodiment, the CPEB comprises a linear low density polyethylene (LLDPE). LLDPE is a substantially linear polyethylene, with significant numbers of short branches. LLDPE is commonly generated by the copolymerization of ethylene with longer chain olefins. LLDPE differs structurally from low-density polyethylene because of the absence of long chain branching. In an embodiment, the LLDPE is a copolymer, for example a copolymer of ethylene with one or more alpha-olefin monomers such as propylene, butene, hexene, etc. An LLDPE suitable for use in this disclosure may generally have a density, determined by ASTM D792, of from 0.900 g/cc to 0.920 g/cc, or from 0.905 g/cc to 0.918 g/cc, or from 0.910 g/cc to 0.918 g/cc. In an embodiment, an LLDPE suitable for use in this disclosure may generally have a melt-mass flow rate, determined by ASTM D1238, of from 0.1 g/10 min. to 50 g/min., or from 0.5 g/10 min. to 30 g/10 min., or from 1 g/10 min. to 20 g/10 min. In an embodiment, an LLDPE suitable for use in this disclosure may generally have a tensile modulus, determined by ASTM D638, of from 20,000 μsi to 250,000 psi, or from 50,000 psi to 220,000 psi, or from 100,000 psi to 200,000 psi. In an embodiment, an LLDPE suitable for use in this disclosure may generally have a flexural modulus, determined by ASTM D790, of from 5,000 psi to 150,000 psi, or from 10,000 psi to 130,000 psi, or from 50,000 psi to 110,000 psi. In an embodiment, an LLDPE suitable for use in this disclosure may generally have a melting temperature, determined by differential scanning calorimetry (DSC), of from 70° C. to 140° C., or from 80° C. to 130° C., or from 90° C. to 120° C.

A representative example of a suitable LLDPE is FINATHENE LL 4010 FE 18, which is an LLDPE commercially available from Total Petrochemicals. The LLDPE (e.g., FINATHENE LL 4010 FE 18) may generally have the physical properties set forth in Table 7.

TABLE 7

| Properties | English | SI | Method |
|---|---|---|---|
| Nominal Resin | | | |
| Density | — | 0.918 g/cm³ | ASTM D792 |
| Melt Index | — | 1.0 g/10 min | ASTM D1238 |
| Thermal | | | |
| Melting Point | 252° F. | 122° C. | ISO 11357-3 |
| Optical | | | |
| Haze | 10.0% | 10.0% | ASTM D1003 |

TABLE 7-continued

| Properties | English | SI | Method |
|---|---|---|---|
| Nominal Film Properties at 0.984 mil (25 um) | | | |
| Film Tensile Strength at Yield, MD | 1600 psi | 11.0 MPa | ISO 527 |
| Film Tensile Strength at Yield,, TD | 1600 psi | 11.0 MPa | ISO 527 |
| Film Elongation at Break, MD | 600% | 600% | ISO 527 |
| Film Elongation at Break, TD | 750% | 750% | ISO 527 |
| Secant Modulus, MD | 23.2 ksi | 0.160 GPa | ISO 5527 |
| Secant Modulus, TD | 24.7 ksi | 0.170 GPa | ISO 5527 |
| Dart Drop Test | 0.198 lb | 90.0 g | ISO 7765-1 |
| Film Tensile Strength at Break, MD | 5800 psi | 40.0 MPa | ISO 527 |
| Film Tensile Strength at Break, TD | 4350 psi | 30.0 MPa | ISO 527 |

Polyolefins suitable for use in this disclosure (e.g., polypropylene, polyethylene) may be prepared using any suitable method. For example, the polyolefin may be prepared using a Ziegler-Natta catalyst, metallocene catalyst, or combinations thereof. The polyethylene, for example, may be prepared using a chromium oxide catalyst, or any other suitable catalysts.

In an embodiment, the polyolefin is prepared using Ziegler-Natta catalysts, which are typically based on titanium and organometallic aluminum compounds, for example triethylaluminum $(C_2H_5)_3Al$. Ziegler-Natta catalysts and processes for forming such catalysts are described in U.S. Pat. Nos. 4,298,718; 4,544,717; and 4,767,735, each of which is incorporated by reference herein in its entirety.

In another embodiment, the polyolefin may be prepared using a metallocene catalyst. Metallocene catalysts may be characterized generally as coordination compounds incorporating one or more cyclopentadienyl (Cp) groups (which may be substituted or unsubstituted, each substitution being the same or different) coordinated with a transition metal through it bonding. Examples of metallocene catalysts and processes for forming such catalysts are described in U.S. Pat. Nos. 4,794,096 and 4,975,403, each of which is incorporated by reference herein in its entirety. Examples of polyolefins prepared through the use of metallocene catalysts are described in further detail in U.S. Pat. Nos. 5,158,920; 5,416,228; 5,789,502; 5,807,800; 5,968,864; 6,225,251; 6,777,366; 6,777,367; 6,579,962; 6,468,936; 6,579,962; and 6,432,860, each of which is incorporated by reference herein in its entirety.

The polyolefin may also be prepared using any other method such as a combination of Ziegler-Natta and metallocene catalysts, for example as described in U.S. Pat. Nos. 7,056,991 and 6,653,254, each of which is incorporated by reference herein in its entirety.

The polyolefin may be formed by placing one or more olefin monomer (e.g., ethylene, propylene) alone or with other monomers in a suitable reaction vessel in the presence of a catalyst (e.g., Ziegler-Natta, metallocene, etc.) and under suitable reaction conditions for polymerization thereof. Any suitable equipment and processes for polymerizing the olefin into a polymer may be used. For example, such processes may include solution phase, gas phase, slurry phase, bulk phase, high pressure processes or combinations thereof. Such processes are described in detail in U.S. Pat. Nos. 5,525,678; 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735; and 6,147,173, which are incorporated herein by reference in their entirety.

In an embodiment, the polyolefin is formed by a gas phase polymerization process. One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from 100 psig to 500 psig, or from 200 psig to 400 psig, or from 250 psig to 350 psig. The reactor temperature in a gas phase process may vary from 30° C. to 120° C., or from 60° C. to 115° C., or from 70° C. to 110° C., or from 70° C. to 95° C., for example as described in U.S. Pat. Nos. 4,543,399; 4,588,790; 5,028,670; 5,317,036; 5,352,749; 5,405,922; 5,436,304; 5,456,471; 5,462,999; 5,616,661; 5,627,242; 5,665,818; 5,677,375; and 5,668,228, which are incorporated herein by reference in their entirety.

In an embodiment, the polyolefin is formed by a slurry phase polymerization process. Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to alkane (e.g., hexane or isobutene). The medium employed is generally liquid under the conditions of polymerization and relatively inert. A bulk phase process is similar to that of a slurry process. However, a process may be a bulk process, a slurry process or a bulk slurry process.

In an embodiment, the CB and/or CPEB comprises polylactic acid. Any suitable polylactic acid may be used in this disclosure. For example, polylactic acid may comprise poly-L-lactide (PLLA), poly-D-lactide (PDLA), poly-LD-lactide (PDLLA), or combinations thereof. Polylactic acid may be prepared using any suitable method. For example, polylactic acid may be prepared by dehydration condensation of lactic acid, such as described in U.S. Pat. No. 5,310,865, which is incorporated herein by reference in its entirety. Alternatively, polylactic acid may be prepared by synthesis of a cyclic lactide (also known as cyclic dimmer) from lactic acid followed by ring opening polymerization of the cyclic lactide. An example of such a process is described in U.S. Pat. No. 2,758,987, which is incorporated herein by reference in its entirety.

Catalysts may be used in the production of polylactic acid. The catalysts may be of any type suitable for the process. Examples of such catalysts include without limitation tin compounds such as tin octylate, titanium compounds such as tetraisopropyl titanate, zirconium compounds such as zirconium isopropoxide, and antimony compounds such as antimony trioxide.

Additives such as those described previously may be introduced to the polylactic acid composition. Additional processes to produce polylactic acid are described in U.S. Pat. Nos. 5,821,327; 5,770,682; 5,508,378; 5,470,944; and 4,797,468, which are incorporated herein by reference in their entirety.

In an embodiment, a polylactic acid suitable for use in this disclosure may have a density of from 1.238 g/cc to 1.265 g/cc, alternatively from 1.24 g/cc to 1.26 g/cc, and alternatively from 1.245 g/cc to 1.255 g/cc as determined in accordance with ASTM D792; a melt index (210° C., 2.16 kg) of from 5 g/10 min. to 35 g/10 min., alternatively from 10 g/10 min. to 30 g/10 min., and alternatively from 10 g/10 min. to 20 g/10 min as determined in accordance with ASTM D1238; a crystalline melt temperature of from 150° C. to 180° C., alternatively from 160° C. to 175° C., and alternatively from 160° C. to 170° C. as determined in accordance with ASTM D3418; a glass transition temperature of from 45° C. to 85° C., alternatively from 50° C. to 80° C., and alternatively from 55° C. to 75° C. as determined in accordance with ASTM D3417; a tensile yield strength of from 4,000 psi to 25,000 psi, alternatively from 5,000 psi to 20,000 psi, and alternatively from 5,500 psi to 20,000 psi as determined in accordance with ASTM D638; a tensile elongation of from 1.5% to 10%, alternatively from 2% to 8%, and alternatively of from 3% to 7% as determined in accordance with ASTM D638; a flexural modulus of from 250,000 psi to 600,000 psi, alternatively from 300,000 psi to 550,000 psi, and alternatively from 400,000 psi to 500,000 psi as determined in accordance with ASTM D790; a notched Izod impact of from 0.1 ft-lb/in to 0.8 ft-lb/in, alternatively from 0.2 ft-lb/in to 0.7 ft-lb/in, and alternatively from 0.4 ft-lb/in to 0.6 ft-lb/in as determined in accordance with ASTM D256.

An example of a polylactic acid suitable for use in this disclosure includes without limitation NatureWorks 3051D, which is commercially available from Nature Works LLC. In an embodiment, polylactic acid suitable for use in this disclosure (e.g., Natureworks 3051D) may generally have the physical properties set forth in Table 8.

TABLE 8

| Properties | 3051D Typical Value | Test Method |
|---|---|---|
| Physical | | |
| Density, g/cc | 1.25 | ASTM D792 |
| Melt Index (210° C., 2.16 kg), g/10 min. | 10-25 | ASTM D1238 |
| Crystalline Melt Temperature, ° C. | 150-165 | ASTM D3418 |
| Glass Transition Temperature, ° C. | 55-65 | ASTM D3417 |

TABLE 8-continued

| Properties | 3051D Typical Value | Test Method |
|---|---|---|
| Mechanical | | |
| Tensile yield strength, psi | 7000 | ASTM D638 |
| Tensile elongation, % | 2.5 | ASTM D638 |
| Flexural Modulus, psi | 555,000 | ASTM D790 |
| Notched Izod impact, ft-lb/in | 0.3 | ASTM D256 |

In an embodiment, polylactic acid is present in the CB and/or CPEB in an amount of from 1 wt. % to 40 wt. % by total weight of the CB, alternatively from 5 wt. % to 30 wt. %, alternatively from 10 wt. % to 20 wt. %.

In an embodiment, the CB and/or CPEB comprise a reactive modifier. Herein, the reactive modifiers refer to polymeric additives that when added to a molten blend of immiscible polymers (e.g., PP and PLA or PE and PLA) form compounds in situ that serve to stabilize the blend. The compounds formed in situ act as compatibilizers and the reactive modifiers are precursors to these compatibilizers.

In an embodiment, the reactive modifier comprises an epoxy-functionalized polyolefin. Examples of epoxy-functionalized polyolefins suitable for use in this disclosure include without limitation epoxy-functionalized polypropylene such as glycidyl methacrylate grafted polypropylene (PP-g-GMA), epoxy-functionalized polyethylene such as polyethylene co glycidyl methacrylate (PE-co-GMA), or combinations thereof. An example of an epoxy-functionalized polyethylene suitable for use in this disclosure includes LOTADER AX8840, which is a PE-co-GMA containing 8% GMA that is commercially available from Arkema.

In another embodiment, the reactive modifier comprises PP-g-GMA. PP-g-GMA may be prepared by any suitable method such as for example by grafting GMA onto polypropylene in the presence of an initiator such as peroxide. Examples of initiators suitable for use in this disclosure include without limitation LUPERSOL 101 and TRIGANOX 301, which are peroxides commercially available from Arkema. In an embodiment, the initiator may be used in an amount of from 0.03% to 2 wt. % by total weight of the blend (i.e., CB or CPEB), alternatively from 0.2 wt. % to 0.8 wt. %, alternatively from 0.3 wt. % to 0.5 wt. %.

The grafting reaction of GMA onto PP may be conducted in a molten state inside an extruder such as for example a single extruder or a twin-screw extruder. Hereinafter, such process is referred to as reactive extrusion. A feedstock comprising PP, GMA, and initiator (i.e., peroxide) may be fed into an extruder reactor sequentially along the extruder, alternatively the feedstock (i.e., PP, GMA, and initiator) may be pre-mixed outside and fed into the extruder.

In an alternative embodiment, the PP-g-GMA is prepared by grafting GMA onto polypropylene in the presence of an initiator and a multi-functional acrylate comonomer. The multi-functional acrylate comonomers may comprise polyethylene glycol diacrylate, trimethylolpropane triacrylate (TMPTA), or combinations thereof.

The multi-functional acrylate comonomer may be further characterized by a high flash point. The flash point of a material is the lowest temperature at which it can form an ignitable mixture in air, as determined in accordance with ASTM D93. The higher the flash point, the less flammable the material, which is a beneficial attribute for melt reactive extrusion. In an embodiment, the multi-functional acrylate comonomer may have a flash point of from 50° C. to 120° C., alternatively of from 70° C. to 100° C., alternatively of from 80° C. to 100° C. Examples of multi-functional acrylate comonomers suitable for use in this disclosure include without limitation SR259 (polyethylene glycol diacrylate), CD560 (alkoxylated hexanediol diacrylate), and SR351 (TMPTA), which are commercially available from Sartomer.

The grafting reaction of GMA onto polypropylene in the presence of a peroxide and the multi-functional acrylate comonomer polyethylene glycol diacrylate is depicted in Scheme 1

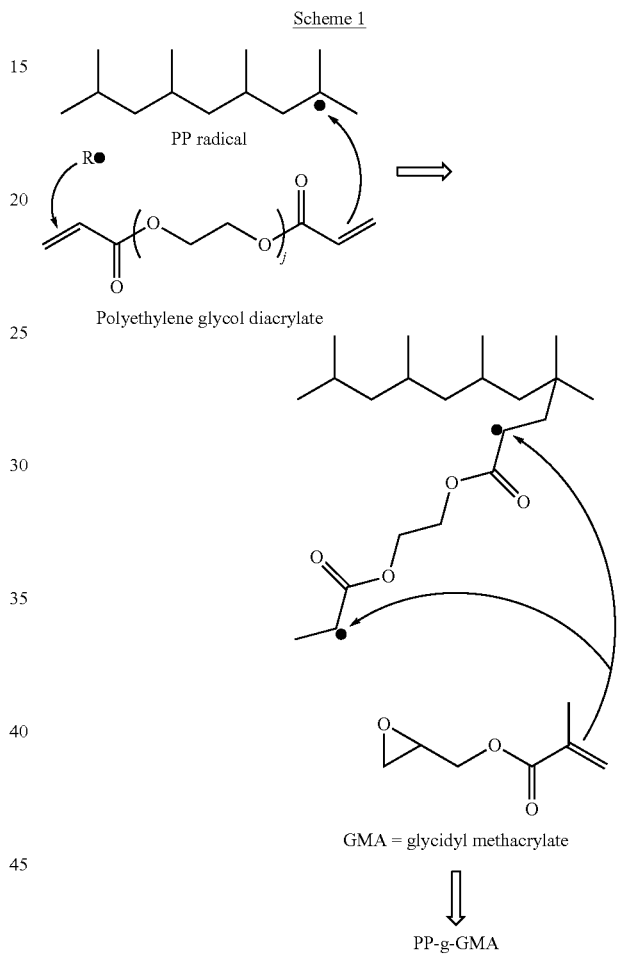

Scheme 1

Polyethylene glycol diacrylate

GMA = glycidyl methacrylate

PP-g-GMA

Without wishing to be limited by theory, the hydrogens on the tertiary carbon of polypropylene molecules can be easily abstracted in the presence of peroxide during reactive extrusion, forming polypropylene macroradicals with unpaired electrons. The polypropylene macroradicals which are generally unstable, tend to form free radicals through a step referred to as "β-scission." β-scission refers to a family of reactions wherein bonds that are in a beta-position to a radical are cleaved resulting in the formation of a double bond and a new radical. The β-scission reaction is believed to be responsible mainly for the formation of internal double bonds thus its occurrence is correlated with the allylic content of the final polymer. β-scission is typically favored over the grafting reaction (i.e. the addition of the GMA) resulting in both a lower grafting of GMA and a polypropylene having a lower average molecular weight. However, in the reactions comprising a multi-functional acrylate comonomer, the multifunctional acrylate comonomer may function to readily capture the polypropylene micro-radicals resulting in the formation of a more stable intermediate (i.e., polypropylene-acrylate radicals). The relatively stable propylene-acrylate radicals tend to react more readily with GMA, which is an acrylate type monomer, and consequently favor the grafting reaction.

Furthermore, as shown in Scheme 1, multiple free radicals may exist on the grafted propylene-acrylate molecules thus making it easier to capture and initiate the reaction of GMA. The reactivity of GMA towards acrylate free radicals may be higher than towards polypropylene tertiary macro-radicals. Consequently, PP-g-GMA prepared using a reaction mixture comprising a multi-functional acrylate comonomer may display a higher degree of grafting than a PP-g-GMA prepared using an otherwise similar composition in the absence of a multi-functional acrylate comonomer. PP-g-GMA prepared using a multifunctional acrylate comonomer is hereinafter referred to as a highly grafted GMA (HGGMA).

In an embodiment, the HGGMA which is a reactive modifier, is prepared from a reaction mixture comprising a polypropylene present in an amount of from 80 wt. % to 99.5 wt. %, alternatively from 90 wt. % to 99 wt. %, and alternatively from 95 wt. % to 99 wt. %; GMA present in an amount of from 0.5 wt. % to 20 wt. %, alternatively from 1.0 wt. % to 10 wt. %, and alternatively from 1.0 wt. % to 5.0 wt. %; a multi-functional acrylate comonomer present in an amount of from 0.5 wt. % to 15 wt. %, alternatively from 1.0 wt. % to 10 wt. %, and alternatively from 1.0 wt. % to 5.0 wt. %; and an initiator present in an amount of from 0.05 wt. % to 1.5 wt. %, alternatively from 0.2 wt. % to 0.8 wt. %, and alternatively from 0.3 wt. % to 0.5 wt. %. The ratio of GMA:multi-functional acrylate comonomer in the HGGMA may range from 1:5 to 10:1, alternatively from 1:2 to 5:1, and alternatively from 1:1 to 3:1.

The amount of grafting of GMA onto the polyolefin may vary depending on a variety of factors such as the type of materials used and processing conditions. Such parameters may be varied by one of ordinary skill in the art with the benefits of this disclosure to produce reactive modifiers having a user-desired grafting yield.

The grafting yield may be determined using any suitable method. For example, the grafting yield may be determined by Fourier Transform Infrared Spectroscopy (FTIR) spectroscopy. In an embodiment, a method for determining the grafting yield comprises obtaining the FTIR spectra of polymeric samples having a mixture of PP and GMA wherein the amount of each component is known. A calibration curve may be generated by plotting the signal intensity at one or more wavelengths as a function of component concentration. The FTIR spectra of a PP-g-GMA sample may then be determined and compared to the calibration curve in order to determine the grafting yield. This method is described in more detail in Angew. Makromol. Chem, 1995, V229 pages 1-13 which is incorporated by reference herein in its entirety. In an embodiment, a HGGMA may have a grafting yield of from 0.2 wt. % to 15 wt. %, alternatively from 0.5 wt. % to 10 wt. %, alternatively from 1.0 wt. % to 5.0 wt. %.

In an embodiment, the reactive modifier is present in the CB and/or CPEB in an amount of from 0.5 wt. % to 15 wt. % based on total weight of the blend, alternatively from 1.0 wt. % to 10 wt. %, alternatively from 3.0 wt. % to 5.0 wt. %.

In an embodiment, the PP, PE, PLA, CB and/or CPEB may also contain additives to impart desired physical properties, such as printability, increased gloss, or a reduced blocking tendency. Examples of additives include without limitation stabilizers, ultra-violet screening agents, oxidants, anti-oxidants, anti-static agents, ultraviolet light absorbents, fire retardants, processing oils, mold release agents, coloring agents, pigments/dyes, fillers, and/or other suitable additives. The aforementioned additives may be used either singularly or in combination to form various formulations of the polymer. For example, stabilizers or stabilization agents may be employed to help protect the polymer resin from degradation due to exposure to excessive temperatures and/or ultraviolet light. These additives may be included in amounts effective to impart the desired properties. Effective additive amounts and processes for inclusion of these additives to polymeric compositions may be determined by one skilled in the art with the aid of this disclosure.

In an embodiment, a CPEB comprises PE, PLA, and a PE-co-GMA all of the type described previously herein. In an embodiment, a CB comprises PP, PLA, and a HGGMA, all of the type previously described herein. Hereinafter the disclosure will focus on a CB comprising PP, PLA, and a reactive modifier although other compatibilized blends (e.g., CPEB) are also contemplated.

In an embodiment, a CB may be prepared by contacting a PP homopolymer, PLA, and a reactive modifier (i.e., epoxy-functionalized polyolefin); each of the type described previously herein under conditions suitable for the formation of a polymeric blend. PP, PLA, and a reactive modifier may be dry blended, fed into a extruder, and melted inside the extruder. The mixing may be carried out using a continuous mixer such as for example a mixer consisting of a intermeshing co-rotating twin screw extruder for mixing/melting the components of the CB and a single screw extruder or a gear pump for pumping. The CB may be further dried in an oven or under vacuum.

Without wishing to be limited by theory, formation of a PP-epoxy-PLA grafted copolymer occurs upon reactive extrusion when at least a portion of the reactive modifier (i.e., epoxy functionalized polyolefin) which is originally associated with the PP migrates to the PP/PLA interface. The reactive modifier may contact the PLA molecules at the interface between the PP and PLA phases and react with the PLA to form PP-epoxy-PLA grafted copolymers at the interface. The compatibilizer (i.e. PP-epoxy-PLA copolymer) that is formed in situ from reactive extrusion of the reactive modifier (i.e., epoxy-functionalized polyolefin), PP, and PLA may perform multiple functions. In a molten state, the compatibilizer may decrease the interfacial tension between PP and PLA and improve dispersion of the PLA phase in the PP. Once the CB solidifies, the compatibilizer remains at the interface of PP and PLA, where it may function to chemically interlink PP and PLA. Thus, the compatibilizers form an adhesive or tie layer that serves to improve the interfacial bonding resulting in CBs having improved phase dispersions and properties when compared to an uncompatibilized PP/PLA blend.

The CBs of this disclosure may be converted to end-use articles by any suitable method. In an embodiment, this conversion is a plastics shaping process such as blowmoulding, extrusion, injection blowmoulding, injection stretch blowmoulding, thermoforming, and the like. In an embodiment, the end-use article is an injection molded article. Examples of end use articles into which the polymeric blend may be formed include food packaging, office supplies, plastic lumber, replacement lumber, patio decking, structural supports, laminate flooring compositions, polymeric foam substrate; decorative surfaces (i.e., crown molding, etc.), weatherable outdoor materials, point-of-purchase signs and displays, housewares and consumer goods, building insulation, cosmetics packaging, outdoor replacement materials, lids and containers (i.e., for deli, fruit, candies and cookies), appliances, utensils, electronic parts, automotive parts, enclosures, protective head gear, reusable paintballs, toys (e.g., LEGO bricks), musical instruments, golf club heads, piping, business machines and telephone components, shower heads, door handles, faucet handles, wheel covers, automotive front grilles, and so forth. The CBs of this disclosure may be converted to fibers (e.g., multi-component fibers, bicomponent fibers, etc.) for use in woven fibers such as fabrics that may be further processed to form textile for example by weaving, knitting, crocheting, knotting, fiber pressing, or combinations thereof. In some embodiments, these fibers may be employed in concentrate reinforcement and woven fibers such as yarns and fabrics for use as binding fibers in multi-fiber woven fabrics. Such multi-fiber woven fabrics may be used in carpet manufacturing. Additional end use articles would be apparent to those skilled in the art with the benefits of this disclosure. In an embodiment, CBs are used for the production of BOPP films as will be described in more detail herein.

The CB and end-use articles constructed therefrom may display improved mechanical properties, strength, and/or tensile properties when compared to an otherwise similar composition lacking a compatibilizer. Hereinafter, property comparisons (e.g., mechanical, physical, optical) are being made in comparison to a polymeric composition comprising an otherwise similar polypropylene composition, or an otherwise similar polylactic acid composition, or an otherwise similar polypropylene and polylactic acid composition lacking a compatibilizer.

In an embodiment, a CB of the type described herein has a melt flow rate (MFR) of from 0.5 to 100 g/10 min., alternatively of from 1.5 to 50 g/10 min., alternatively of from 5.0 to 20 g/10 min. MFR as defined herein refers to the quantity of a melted polymer resin that will flow through an orifice at a specified temperature and under a specified load. The MFR may be determined using a dead-weight piston Plastometer that extrudes polypropylene through an orifice of specified dimensions at a temperature of 230° C., and a load of 2.16 kg in accordance with ASTM D1238.

In an embodiment, the article is an injection molded article. In such embodiment, an injection molded article constructed from a CB of the type described herein displays an increased tensile modulus. The tensile modulus is the ratio of stress to elastic strain in tension. Therefore, the larger the tensile modulus the more rigid the material, and the more stress required to produce a given amount of strain. In an embodiment, the article may exhibit a tensile modulus of from 200 kpsi to 350 kpsi, alternatively of from 220 kpsi to 300 kpsi, alternatively of from 250 kpsi to 300 kpsi, as determined in accordance with ASTM D638.

In an embodiment, an injection molded article constructed from a CB of the type described herein displays a comparable impact strength to polypropylene and/or an uncompatibilized PP/PLA blend as reflected in a similar notched Izod impact strength. Izod impact is defined as the kinetic energy needed to initiate a fracture in a specimen and continue the fracture until the specimen is broken. Tests of the Izod impact strength determine the resistance of a polymer sample to breakage by flexural shock as indicated by the energy expended from a pendulum type hammer in breaking a standard specimen in a single blow. The specimen is notched which serves to concentrate the stress and promote a brittle rather than ductile fracture. Specifically, the hod impact test measures the amount of energy lost by the pendulum during the breakage of the test specimen. The energy lost by the pendulum is the sum of the energies required to initiate sample fracture, to propagate the fracture across the specimen, and any other energy loss associated with the measurement system (e.g., friction in the pendulum bearing, pendulum arm vibration, sample toss energy, etc.). In an embodiment, the article may exhibit a notched Izod impact strength of from 0.2 ft-lb/inch to 2.0 ft-lb/inch, alternatively of from 0.5 ft-lb/inch to 1.5 ft-lb/inch, alternatively of from 0.6 ft-lb/inch to 1.0 ft-lb/inch, as determined in accordance with ASTM D256.

In an embodiment, an injection molded article constructed from a CB of the type described herein displays an increased tensile strength at yield. The tensile strength at yield is the force per unit area required to yield a material. In an embodiment, the article may exhibit a tensile strength at yield of from 4,000 psi to 6,000 psi, alternatively of from 4,500 psi to 5,800 psi, alternatively of from 5,000 psi to 5,500 psi, as determined in accordance with ASTM D882.

In an embodiment, an injection molded article constructed from a CB of the type described herein displays increased stiffness as reflected in an increased flexural modulus. The flexural modulus test in broad terms measures the force required to bend a sample material beam. The force is applied to the center of the sample beam, while the beam is supported on both ends. In an embodiment, the article may exhibit a flexural modulus of from 170 kpsi to 300 kpsi, alternatively from 180 kpsi to 250 kpsi, alternatively from 200 kpsi to 250 kpsi, as determined in accordance with ASTM D790.

In an embodiment, the article is a film, alternatively a biaxially oriented film. Generally, orientation of a polymer composition refers to the process whereby directionality (the orientation of molecules relative to each other) is imposed upon the polymeric arrangements in the film. Such orientation is employed to impart desirable properties to films, such as toughness and opaqueness, for example. As used herein, the term "biaxial orientation" refers to a process in which a polymeric composition is heated to a temperature at or above its glass-transition temperature but below its crystalline melting point. Immediately following heating, the material may then be extruded into a film, and stretched in both a longitudinal direction (i.e., the machine direction) and in a transverse or lateral direction (i.e., the tenter direction).

In an embodiment, a CB of the type described herein is heated in an extruder to a temperature of equal to or less than 210° C., or from 180° C. to 250° C., or from 200° C. to 220° C. The molten polymer may then exit through a die and the molten plaque may be used to form an extruded film, a cast film, a biaxially oriented film, or the like. In an embodiment, the molten plaque may exit through the die and be taken up onto a roller without additional stretching to form an extruded film. Alternatively, the molten plaque may exit through the die and be uniaxially stretched while being taken up onto a chill roller where it is cooled to produce a cast film.

In an embodiment, the molten plaque exits through the die and is passed over a first roller (e.g., a chill roller) which solidifies the polymeric composition (i.e., CB) into a film. Then, the film may be oriented by stretching such film in a longitudinal direction and in a transverse direction. The longitudinal orientation is generally accomplished through the use of two sequentially disposed rollers, the second (or fast roller) operating at a speed in relation to the slower roller corresponding to the desired orientation ratio. Longitudinal orientation may alternatively be accomplished through a series of rollers with increasing speeds, sometimes with additional intermediate rollers for temperature control and other functions.

After longitudinal orientation, the film may be cooled, pre-heated, and passed into a lateral orientation section. The lateral orientation section may include, for example, a tenter frame mechanism, where the film is stressed in the transverse direction. Annealing and/or additional processing may follow such orientation.

Alternatively, the film may be stretched in both directions at same time. In an embodiment, the film may be produced using a stretching force of from 0.2 MPa to 15 MPa, alternatively from 1.0 MPa to 10 MPa, alternatively from 2.0 MPa to 7 MPa. In an embodiment, the film is oriented in the machine direction at a temperature of from 90° C. to 170° C., alternatively from 100° C. to 165° C., and alternatively from 125° C. to 160° C. and is oriented in the transverse direction at a temperature of from 100° C. to 180° C., alternatively from 115° C. to 170° C., and alternatively from 125° C. to 165° C.

Without wishing to be limited by theory, on cooling, the molecular alignment imposed by stretching competes favorably with crystallization, and the drawn polymer molecules condense into a crystalline network with crystalline domains aligned in the direction of the stretching force. Additional disclosure on biaxial film production may be found in U.S. Pat. No. 4,029,876 and U.S. Pat. No. 2,178,104, each of which is incorporated by reference herein in its entirety.

Further, the films prepared from CBs of the type described herein may form one or more layers of a multilayer film. The additional layers of the multilayer film may be any suitable coextrudable film, such as syndiotactic polypropylene, low density polyethylene, linear low density polyethylene, medium density polyethylene, high density polyethylene, ethylene-propylene copolymers, butylenes-propylene copolymers, ethylene-butylene copolymers, ethylene-propylene-butylene terpolymers, ethylene-vinyl acetate copolymers, ethylene-vinyl alcohol copolymers, nylons, and the like, or combinations thereof.

In an embodiment, a BOPP film constructed from a CB of the type described herein may display improved stiffness as reflected in an increased 1% secant modulus. The secant modulus is a measure of the stress to strain response of a material or the ability to withstand deformation under an applied force. In an embodiment, the BOPP film may have a 1% secant modulus of from 200 kpsi to 400 kpsi, alternatively from 250 kpsi to 380 kpsi, alternatively, from 300 kpsi to 350 kpsi, as determined in accordance with ASTM D882.

The CB may display improved tensile properties as reflected in an increase in the tensile strength at break (also termed yield/break strength) and tensile elongation at break (also termed elongation at yield/break). The tests to determine tensile properties may be carried out in a machine direction (MD), which is parallel to the direction of polymer orientation and/or a transverse direction (TD), which is perpendicular to the direction of polymer orientation. The tensile strength at break is the force per unit area required to break a material. In an embodiment, the tensile strength at break in the MD ranges from 20 kpsi to 40 kpsi, or from 25 kpsi to 35 kpsi, or from 30 kpsi to 33 kpsi, as determined in accordance with ASTM D882. The tensile elongation at break is the percentage increase in length that occurs before a material breaks under tension. In an embodiment, the tensile elongation at break in the MD ranges from 50% to 150%, or from 70% to 120%, or from 80% to 100%, as determined in accordance with ASTM D882.

The BOPP film produced from the CBs disclosed herein may display improved shrinkage, optical properties, barrier properties and/or printability when compared to a similar BOPP film produced using an otherwise similar PP homopolymer or otherwise similar PLA homopolymer or an uncompatibilized PP/PLA blend.

In an embodiment, BOPP film produced from the CBs disclosed herein may display reduced shrinkage. Film shrinkage may be calculated by first measuring the length of contraction upon cooling in the in-flow direction (termed MD when measuring differential shrinkage) and the length of contraction occurring in the cross-flow direction (termed TD when measuring differential shrinkage). The difference in the in-flow and cross-flow contractions at a given temperature, multiplied by 100% gives the percent shrinkage. In an embodiment, the BOPP films produced from CBs of the type described herein have a shrinkage at 125° C. of from 5% to 20%, or from 8% to 15%, or from 10% to 12%.

In an embodiment, BOPP film produced from the CBs disclosed herein display increased gloss and reduced haze. The gloss of a material is based on the interaction of light with the surface of a material, more specifically the ability of the surface to reflect light in a specular direction. Gloss is measured by measuring the degree of gloss as a function of the angle of the incident light, for example at 45° incident angle (also known as "gloss 45°"). In an embodiment, the BOPP films produced from CBs of the type described herein have a gloss 45° of from 50 to 130, or from 80 to 130, or from 100 to 130, as determined in accordance with ASTM D2457.

Haze is the cloudy appearance of a material cause by light scattered from within the material or from its surface. The haze of a material can be determined in accordance with ASTM D1003-00 for a haze percentage of equal to or lower than 30%. A material having a haze percentage of greater than 30% can be determined in accordance with ASTM E167. In an embodiment, the BOPP films produced from CBs of the type described herein have a haze percentage of from 1% to 90%, or from 3% to 50%, or from 5% to 10%.

BOPP films produced from the CBs of this disclosure may display an similar oxygen transmission rate (OTR). OTR is the steady state rate at which oxygen gas permeates through a film at specified conditions of temperature and relative humidity. OTR may be measured by exposing one side of a film to an oxygen atmosphere. As the oxygen solubilizes into the film and permeates through the material, nitrogen sweeps the opposite side of the film and transports the transmitted oxygen molecules to a coulometric sensor. This value is reported as a transmission rate. When this rate is multiplied by the average thickness of the material, the results are considered a permeability rate. In an embodiment, the BOPP films produced from the CBs of this disclosure have oxygen transmission rates of from 100 to 300 cc/100 in$^2$/24 h at 100° F., or from 150 to 250 cc/100 in$^2$/24 h at 100° F., or from 180 to 220 cc/100 in$^2$/24 h at 100° F. as determined in accordance with ASTM D3895.

The BOPP films produced from the CBs of this disclosure may display an increased surface tension. The surface tension of the BOPP films produced from the CBs of this disclosure may be determined by determining the contact angle between a droplet of water and the BOPP film. The contact angle is the angle at which a liquid/vapor (e.g., water droplet) interface meets the surface of the film. In an embodiment, the BOPP films produced from CBs of the type described herein have contact angle of from 90° to 110°, or from 95° to 106°, or from 100° to 103°, as determined in accordance with ASTM D5946.

In an alternative embodiment, a CB of the type described herein is used to prepare a cast film. The cast film may have a contact angle that ranges from 90° to 110°, alternatively from 95° to 105°, and alternatively from 98° to 102° as determined in accordance with ASTM D5946. Without wishing to be limited by theory, a high contact angle suggests a lower surface tension and increased printability.

In an embodiment, a CB of the type described herein when formed into a film may have a reduced surface roughness. A measure of the surface roughness may be conducted by using an atomic force microscope (AFM). In AFM topology pictures, Ra is the most commonly used parameter to describe the average surface roughness and is defined as an integral of the absolute value of the roughness profile measured over an evaluation length. Z-range refers to the average displacement in the z-direction, reflecting peak-to-valley surface roughness.

EXAMPLES

The disclosure having been generally described, the following examples are given as particular embodiments of the disclosure and to demonstrate the practice and advantages thereof. It is understood that the examples are given by way of illustration and are not intended to limit the specification or the claims to follow in any manner. Hereinafter, unless otherwise indicated, the amount of components in a composition or formulation is presented as percentages which denote the weight percent of the component based on the total weight of the composition.

Example 1

The degree of GMA grafting onto polypropylene during the preparation of a reactive modifier (i.e., PP-g-GMA) was investigated. The samples were prepared from using a base polypropylene resin, 3276, which is a polypropylene homopolymer commercially available from Total Petrochemicals and GMA with a flash point of 85° C. and viscosity of 2.7 cps which is commercially available from Dow Chemicals. The multi-functional acrylate comonomers were SR259 polyethylene glycol (200) diacrylate with a viscosity of 25 cps and SR351 trimethylolpropane triacrylate (TMTPA) esters with a viscosity of 106 cps; both of which are commercially available from Sartomer. The initiator used was peroxide LUPERSOL 101 (L101). Formulations are set forth in Table 9 as weight parts per hundred parts of the base resin (phr).

The 3276 fluff was mixed with the multi-functional acrylate comonomer (i.e., GMA) and the initiator in a 50 liter mixer in the amounts of 30 lbs. Next, the mixed fluff was fed into a MICRO-27 twin-screw extruder at a screw speed of 100 rpm with vacuum devolatilization enabled and a throughput of 10 lbs/hr. The zone profiles were 400° F.-400° F.-395° F.-390° F.-380° F.-375° F.-370° F.-365° F.-360° F.-360° F.-360° F.-360° F. The experimental processing parameters are summarized in Table 9.

The grafting yield was then measured based on Fourier Transform Infrared Spectroscopy (FTIR) spectra of the resulting PP-g-GMA products. The PP-g-GMA products were dissolved in hot xylene and precipitated in an excess amount of acetone. The GMA oligomers are soluble in acetone. The precipitated PP-g-GMA was then dried under vacuum, and compressed with KBr into disks for FTIR analysis. FIG. 1 is the FTIR spectra of the various PP-g-GMA samples. Referring to FIG. 1, the presence of polypropylene can be detected by the appearance of a peak at $2722$ $cm^{-1}$ for all samples. Sample 1 is the re-extrusion of the base resin with 0.05 phr of peroxide. Sample 2 is a GMA-grafted PP, which was prepared using conventional reactive extrusion formulations (i.e., in the absence of a multi-functional acrylate comonomer), exhibited negligible C═O peak intensity at $1730$ $cm^{-1}$, the peak assigned to the grafted GMA, indicating that minimal GMA grafting yield was obtained. However, when a multi-functional acrylate comonomer was present (Samples 3 and 4), a strong C═O peak was observed.

Figure 2:
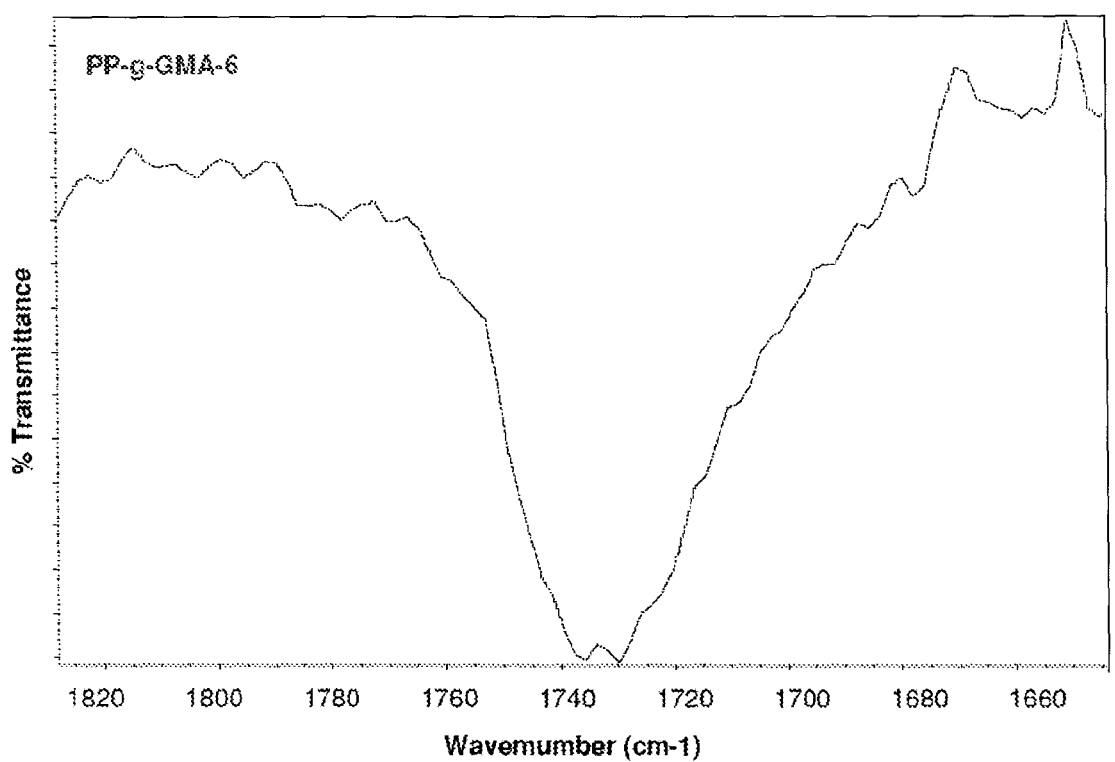

Closer examination of the C═O peak at $1730$ $cm^{-1}$ for Samples 3 and 4, shown in FIG. 2, suggests the signal is actually two overlapping peaks indicating that both the GMA and the multi-functional acrylate comonomer were grafted onto the polypropylene backbone. The weak epoxy peak at approximately $860$ $cm^{-1}$, which was assigned to GMA molecules grafted onto polypropylene main chains, is also visible in the FTIR spectra.

The grafting yield (GMA %) was then calculated based on the FTIR results and are also tabulated in Table 9. With GMA as a neat monomer (without a multi-functional acrylate comononer), the grafting yield observed in Sample 2 was negligible. However, at a ratio of 3:1 GMA: multi-functional acrylate comonomer, the grafting yield increased as shown in Samples 3 and 4. PP-g-GMA prepared as described in this Example may be combined with other components as described herein (e.g., PP and PLA) to form CBs. Without wishing to be limited by theory, high grafting PP-g-GMA can be more effective in compatibilizing PP/PLA blends to form CBs.

Example 2

The melt pressure of the CB made from 3271 and PLA 6201D with and without various reactive modifiers were monitored during extrusion. Sample 5 was a PP/PLA blend without a reactive modifier, Sample 6 was a PP/PLA blend that included PP-g-GMA-3 as the reactive modifier, Sample 7 was a PP/PLA blend that included PP-g-GMA-6 as the reactive modifier, and Sample 8 was a PP/PLA blend that included

TABLE 9

| | Formulations | | | Extrusion parameters | | | Melt | Products | |
|---|---|---|---|---|---|---|---|---|---|
| Sample # | Base Resin | GMA (phr) | Co-mo (phr) | L-101 (phr) | Output (lbs/hr) | Screw (rpm) | Torque (%) | temp/Pressure (F./psi) | MFR (g/10 min.) | GMA (%) |
| #1 (PP) | 3276 fluff | 0 | | 0.05 | 10 | 100 | 33 | 385.6/310 | 15.6 | 0 |
| #2 (PP-g-GMA-3) | 3276 fluff | 3 | | 0.30 | 10 | 100 | 32 | 389.0/250 | 25.5 | −0.2% |
| #3 (PP-g-GMA-6) | 3276 fluff | 3 | 1(SR259) | 0.30 | 10 | 100 | 29 | 386/200 | 36.2 | −3.0% |
| #4 (PP-g-GMA-7) | 3276 fluff | 1.7 | 1(SR351) | 0.30 | 10 | 100 | — | —/— | 25.6 | −2.0% |

LOTADER AX8840 as the reactive modifier. LOTADER AX8840 is a reactive polyethylene resin functionalized with GMA commercially available from Arkema. PP-g-GMA-3 is a low grafting functionalized polypropylene used to prepare grafted PP-g-GMA comprising less than 0.5% GMA, PP-g-GMA-6 is a high grafting functionalized polypropylene use to prepare high grafted PP-g-GMA comprising 3% GMA which were prepared as described in Example 1 and LOTADER AX8840 is a polyethylene functionalized resin used to prepare high grafted PP-g-GMA comprising 8% GMA.

The reaction mixture formulations and MFR of the PP/PLA blends produced are summarized in Table 10.

TABLE 10

| Sample | Blends | MFR (g/10 min.) | Reactions In Melt | Graft Copolymer | Compatibilization |
|---|---|---|---|---|---|
| 5 | PP/PLA | 2.2 | No | No | No |
| 6 | PP/PLA/PP-g-GMA-3 | 2.2 | Epoxide with —COOH | PP-g-GMA-co-PLA | Yes |
| 7 | PP/PLA/PP-g-GMA-6 | 2.0 | Epoxide with —COOH | PP-g-GMA-co-PLA | Yes |
| 8 | PP/PLA/Lotader | 1.9 | Epoxide with —COOH | PP-co-GMA-co-PLA | Yes |

3271 was blended with 10% PLA 6201D (previously dried at 75° C. for 6 hours under vacuum prior to extrusion) and 5% of the indicated compatibilizer. The blended mixtures were extruded in a 27 mm co-rotating twin screw extruder. The screw speed of the extruder was set at 100 rpm and the output rate was at 15 lbs/hr. Devol ports were vacuumed to remove any volatiles generated during extrusion.

Figure 3:
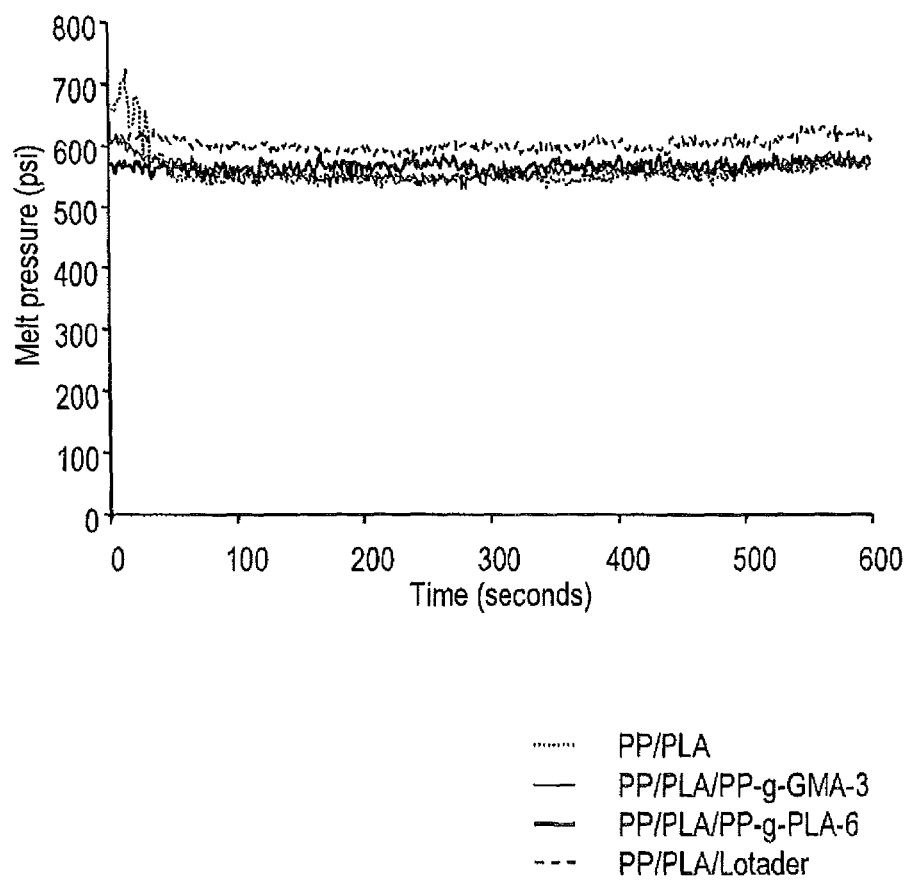
FIG. 3 is a plot of melt pressure as a function of time for the samples from Example 2.

FIG. 3 shows the melt pressure data for each sample as a function of extrusion time. Compared with uncompatibilized PP/PLA blend (Sample 5), the addition of PP-g-GMA-3 (Sample 6) did not affect the melt pressure of the composition, whereas the presence of high grafting PP-g-GMA-6 (Sample 7) slightly increased the melt pressure of the PP/PLA blend. Without wishing to be limited by theory, the slight increase could be due to the reaction of the epoxide groups in the PP-g-GMA with PLA —COOH groups, forming PP-g-GMA-co-PLA copolymers and causing the slight increase in the melt pressure. The PP/PLA/LOTADER blend (Sample 8) shows the highest melt pressure, which may be attributable to the high GMA content in Sample 8 that may have acted as an effective chain extender for PLA during melt extrusion.

The extruded pellets were compression molded and subsequently characterized for phase dispersions via Atomic Force Microscope (AFM). The resulting AFM pictures are shown in FIG. 4. Referring to FIG. 4, all samples are observed to form an immiscible blend where the PLA phase 10 is dispersed in the polypropylene phase 20. The PLA phases 10 in the uncompatibilized PP/PLA blend (Sample 5) were observed to have a variety of sizes ranging up to and greater than 5 micrometer (μm). The PLA phases 10 in PP-g-GMA-3 (Sample 6) were smaller and more dispersed than in the uncompatibilized PP/PLA blend (Sample 5). The PLA phases 10 in the PP/PLA/LOTADER blend (Sample 8) were smaller and more dispersed than those observed in the uncompatibilized PP/PLA blend and the PP-g-GMA-3 blend. Finally, the PLA phases 10 observed in PP-g-GMA-6 blend (Sample 7) were smaller with more uniform sizes and more dispersed than observed in the other samples (Sample 5, 6, 8).

Example 3

The yield strengths of bi-axially oriented films prepared from CBs produced with various reactive modifiers were investigated and compared to PP. Four samples, designated Samples 10-13, were prepared from the formulations listed in Table 11. The reactive modifiers were epoxy-functionalized PP (GMA-3 and GMA-6) and epoxy-functionalized PE (LOTADER) as indicated. The blends were prepared and cast into 16 mil thick sheets and stretched using a Bruckner Karo IV. The areal draw ratio was 6×6 with a stretching speed of 30 m/min in both machine and transverse directions. The materials could be stretched with a broad temperature window of 130° C. to 155° C.

TABLE 11

| Sample | Sample Names | Description |
|---|---|---|
| 10 | PP/PLA | 3271/10% PLA |
| 11 | GMA-3 | 3271/10% PLA/5% PP-g-GMA-3 |
| 12 | GMA-6 | 3271/10% PLA/5% PP-g-GMA-6 |
| 13 | LOTADER | 3271/10% PLA/5% LOTADER AX8840 |

Figure 5:
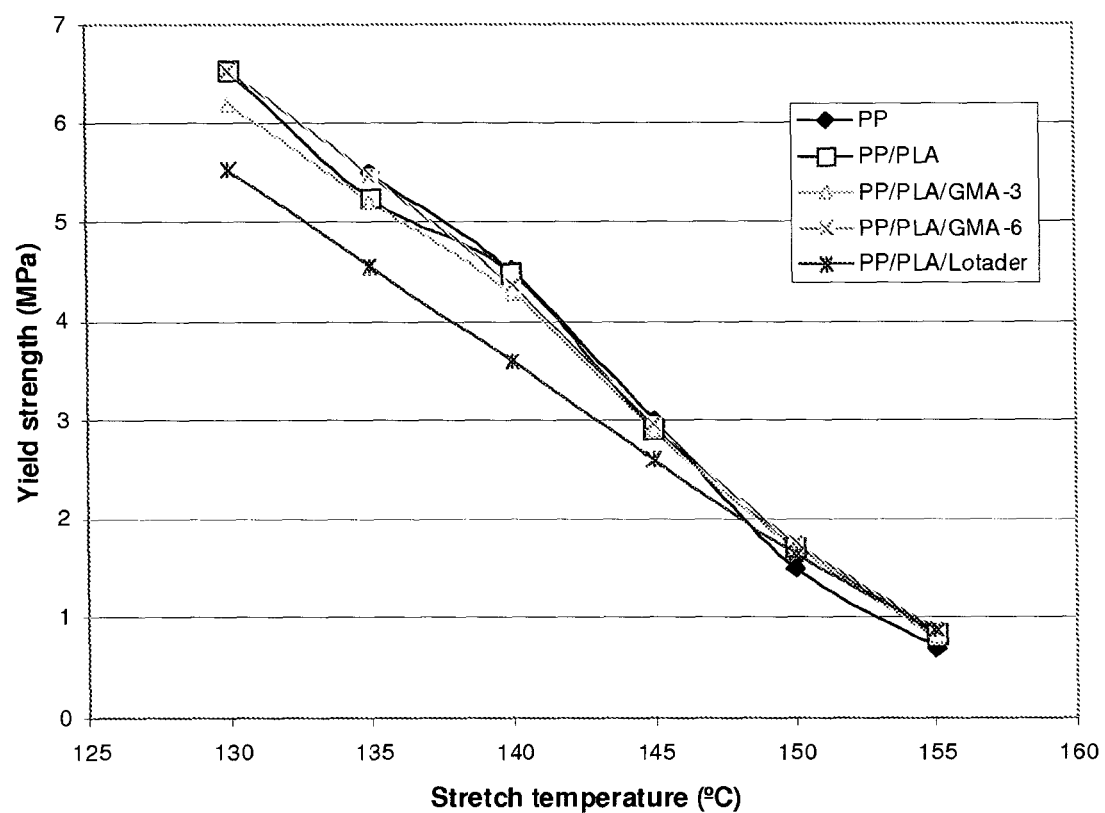
FIG. 5 is a plot of yield strength as a function of stretch temperature for the samples from Example 3.

The results are tabulated in Table 12 and plotted in FIG. 5.

TABLE 12

| Stretch Temperature, ° C. | PP 3271 | Sample 10 PP/PLA | Sample 11 PP/PLA/GMA-3 | Sample 12 PP/PLA/GMA-6 | Sample 13 PP/PLA/Lotader |
|---|---|---|---|---|---|
| 130 |  | 6.54 | 6.19 | 6.54 | 5.53 |
| 135 | 5.5 | 5.24 | 5.21 | 5.48 | 4.55 |
| 140 | 4.5 | 4.48 | 4.28 | 4.36 | 3.6 |
| 145 | 3 | 2.92 | 2.9 | 2.97 | 2.6 |
| 150 | 1.5 | 1.72 | 1.71 | 1.76 | 1.64 |
| 155 | 0.7 | 0.84 | 0.8 | 0.88 | 0.87 |

FIG. 5 is a plot of stretching yield strength in the machine direction as a function of stretch temperatures. Referring to FIG. 5, most samples could be stretched at a comparable stretching force for a given temperature, with the exception of Sample 13. Sample 13 comprising 5% LOTADER displayed a stretching force that was lowered by 15% when compared to the uncompatibilized PP/PLA blend (Sample 10). Thus, the LOTADER compatibilized PP/PLA blend could give an easier stretching and broader processing window for a polypropylene resin such as a high crystallinity polypropylene (HCPP).

Example 4

The optical properties for the BOPP films produced from the various CB samples stretched at 135° C. from Example 3 were investigated. The haze percentages and the gloss 45° percentages were determined and the results are tabulated in Table 13 and plotted in FIG. 6.

TABLE 13

| Samples | Haze (%) | Gloss (%) |
|---|---|---|
| PP 3271 | 0.5 | 93 |
| Sample 10 PP/PLA | 67.8 | 113.3 |
| Sample 11 PP/PLA/GMA-3 | 52.1 | 106.3 |
| Sample 12 PP/PLA/GMA-6 | 21.7 | 83.6 |
| Sample 13 PP/PLA/Lotader | 20.3 | 55.3 |

Figure 6:
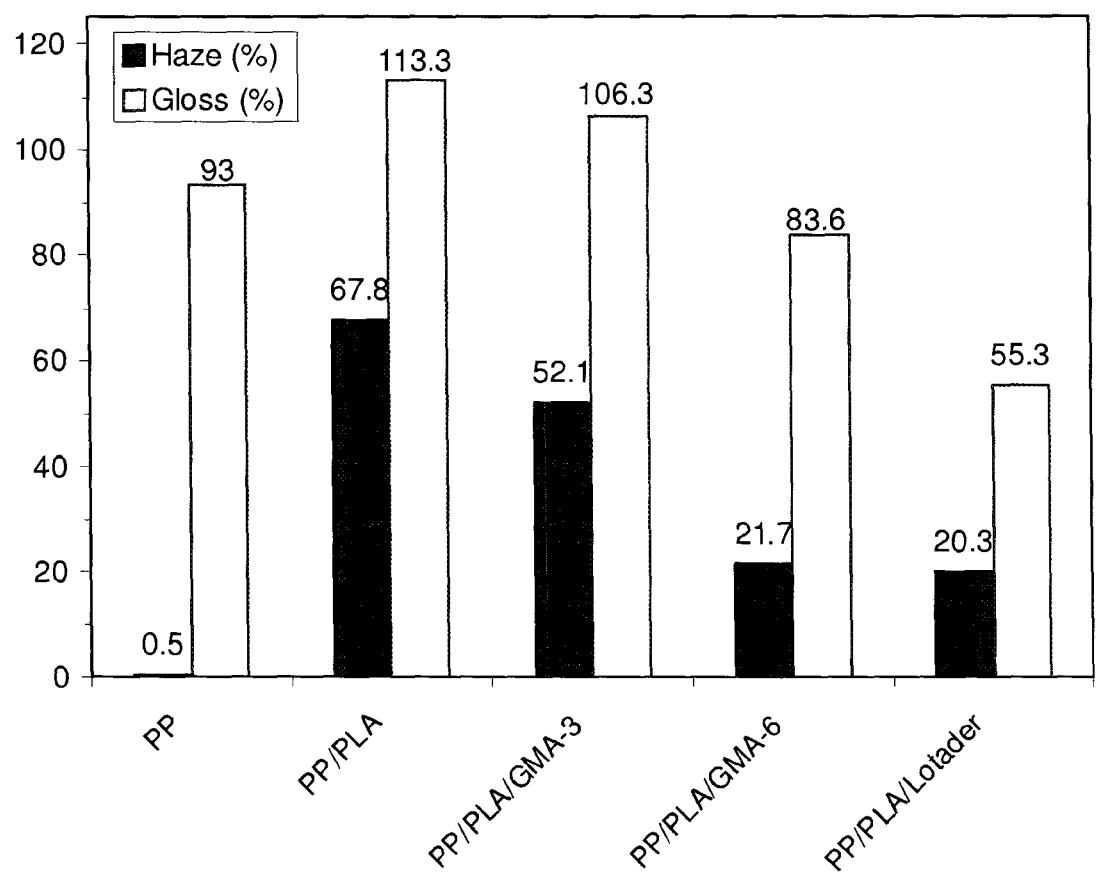
FIG. 6 is a plot of haze and gloss 45° for the samples from Example 3 stretched at 135° C.

Referring to FIG. 6, BOPP films of the uncompatibilized PP/PLA blend (Sample 10) appeared hazy with a haze percentage of 70%. The presence of the reactive modifiers generally reduced the haze of the films. The samples prepared with GMA-6 and LOTADER, Samples 12 and 13 respectively, resulted in clearer BOPP films with haze percentages that were lowered by 20% when compared to the uncompatibilized PP/PLA blend. The low haze percentage results for GMA-6 and LOTADER suggested that both reactive modifiers may be able to reduce the interfacial tension during melt blending and provide good PLA dispersion. In addition, without wishing to be limited by theory, these compatibilized systems may have reinforced interfaces in the solid state, preventing separation of matrix-particle boundaries during bi-axial orientation, and minimizing cavitation that further reduces film clarity.

Example 5

Figure 7:
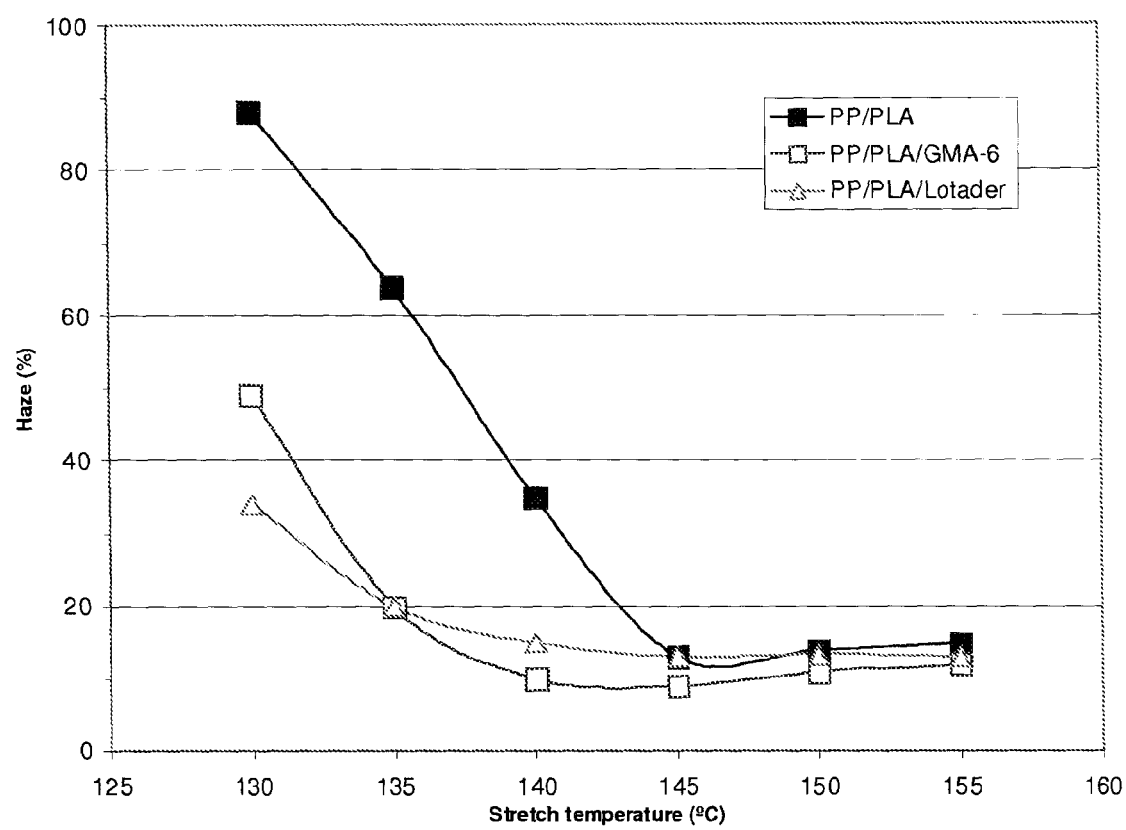
FIG. 7 is a plot of haze as a function of stretch temperature for the samples from Example 3.

The haze of BOPP films produced from a PP/PLA blend comprising GMA-6 or LOTADER was further investigated. Samples 10, 12, and 13 from Example 3 were stretched at six different stretch temperatures ranging from 130° C. to 155° C. The haze percentage for each film was then determined and the results are tabulated in Table 14 and presented in FIG. 7 where haze percentage is plotted as a function of stretch temperature.

TABLE 14

| Stretch Temperature, ° C. | Sample 10 PP/PLA | Sample 12 PP/PLA/GMA-6 | Sample 13 PP/PLA/Lotader |
|---|---|---|---|
| 130 | 88 | 49 | 34 |
| 135 | 64 | 20 | 20 |
| 140 | 35 | 10 | 15 |
| 145 | 13 | 9 | 13 |
| 150 | 14 | 11 | 13.4 |
| 155 | 15 | 12 | 13 |

The results demonstrate that Sample 10, an uncompatibilized PP/PLA blend, appeared hazy with a high haze percentage at low temperatures and appeared to be clearer with reduced haze percentages at higher stretch temperatures. The haze percentage reached the lowest value at 145° C., and slightly increased as the stretch temperatures increased. The PP/PLA blends with reactive modifiers behaved similarly in that at lower temperatures, the haze percentages for Samples 12 and 13 were lower than that observed for Sample 10. At higher temperatures, the haze percentages for Samples 12 and 13 were similar to Sample 10. Additionally, Sample 12 with GMA-6 as the reactive modifier resulted in lower haze percentages than Sample 13 with LOTADER as the reactive modifier over a broader stretch temperatures.

The gloss 45° at various stretch temperatures for Samples 10, 12, and 13 was also investigated. The results are tabulated in Table 15 and plotted in FIG. 8.

TABLE 15

| Stretch Temperature, ° C. | Sample 10 PP/PLA | Sample 12 PP/PLA/GMA-6 | Sample 13 PP/PLA/Lotader |
|---|---|---|---|
| 130 | 123 | 120 | 70 |
| 135 | 106 | 85 | 55 |
| 140 | 86 | 63 | 50 |
| 145 | 56 | 63 | 51 |
| 150 | 51 | 58 | 52 |
| 155 | 51 | 53 | 52 |

Figure 8:
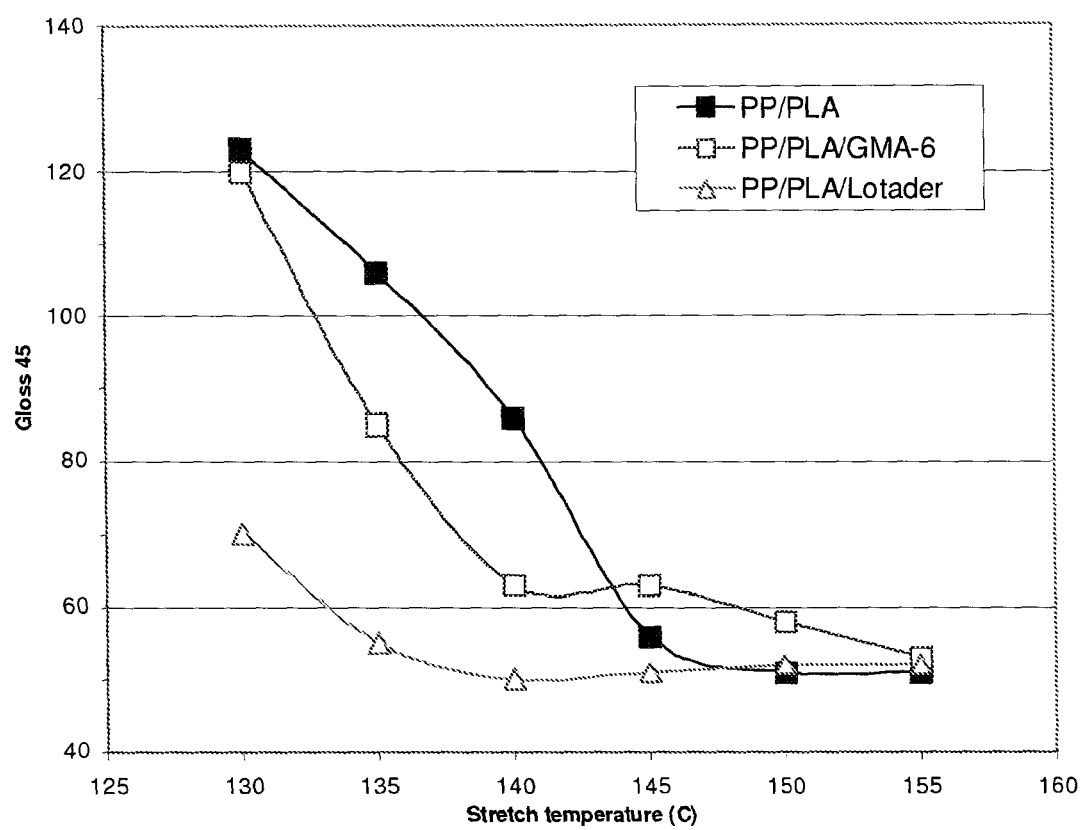
FIG. 8 is a plot of gloss 45° as a function of stretch temperature for the samples from Example 3.

FIG. 8 is a plot of gloss 45° as a function of stretch temperature. The trend for gloss 45° was observed to be similar to the trend for haze percentage. Referring to FIG. 8, both Samples 10 and 12 stretched at 130° C. were highly glossy as shown by its high gloss 45°. The gloss 45° for Sample 13 was lower compared to Samples 10 and 12. Overall, the gloss 45° decreased as the stretch temperature increased up to a temperature of 145° C., and then the gloss 45° leveled off from 145° C. to 155° C.

Figure 9:
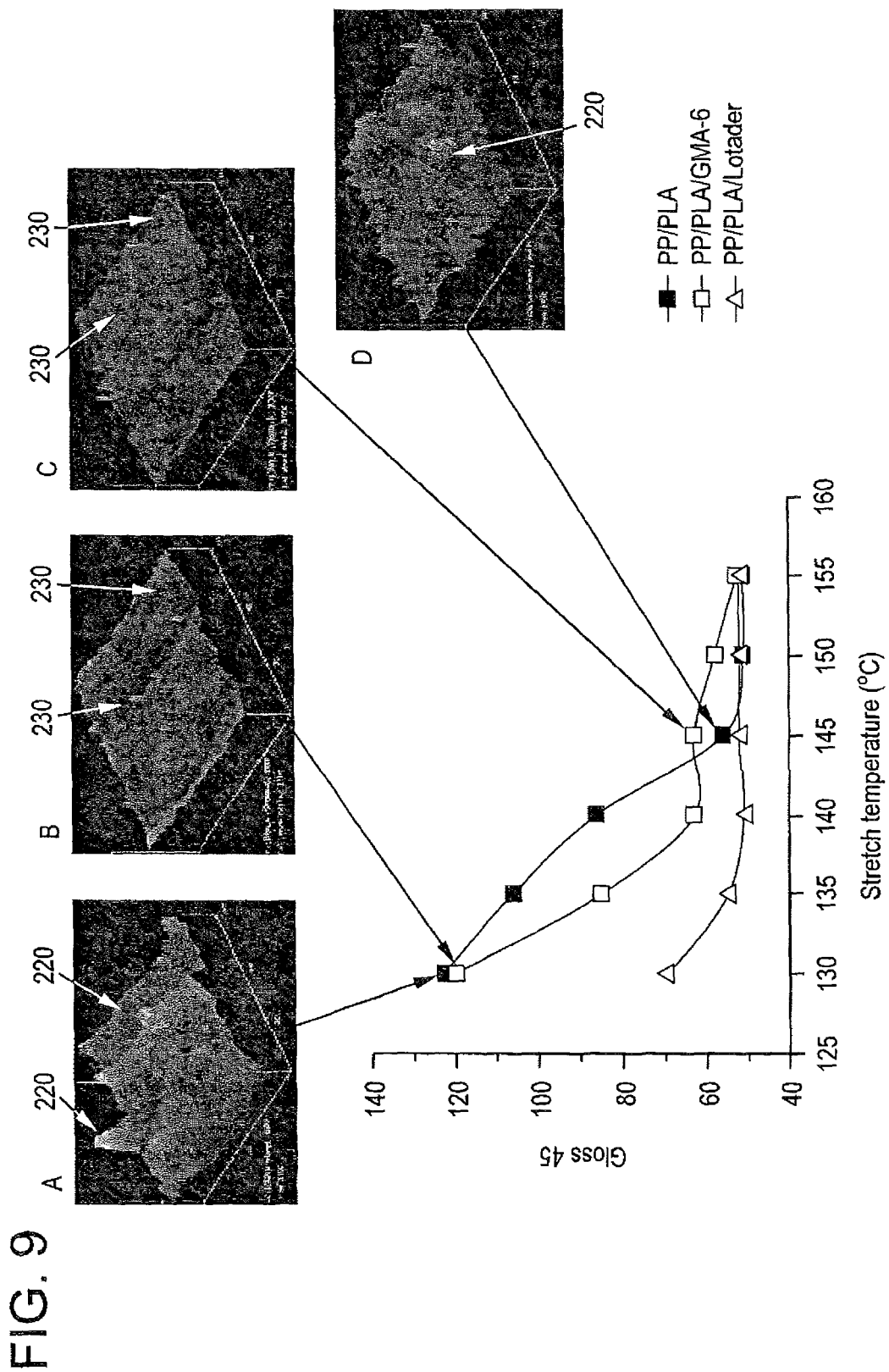
FIG. 9 is a plot of gloss 45° as a function of stretch temperature as correlated with atomic force microscopy pictures for the samples from Example 2

The surface roughness for BOPP films was also investigated. Without wishing to be limited by theory, surface haze usually contributes significantly to the film total haze since the surfaces are usually rougher for high haze BOPP films. AFM pictures were obtained for both Samples 10 and 12 from Example 3 at two stretch temperatures 130° C. and 145° C., as shown in FIG. 9. The surface roughness was also quantified based on the AFM pictures and the results are shown in Table 16. Ra is the most commonly used parameter to describe the average surface roughness and is defined as an integral of the absolute value of the roughness profile measured over an evaluation length. Z-range refers to the average displacement in the z-direction, reflecting peak-to-valley surface roughness.

TABLE 16

| Sample | | PP | PLA | Compatibilizer | Draw Ratio | Temp °C. | Roughness | | | |
|---|---|---|---|---|---|---|---|---|---|---|
| | | | | | | | Ra (nm) | | Z Range (μm) | |
| | | | | | | | Avg | Std Dev | Avg | Std Dev |
| 10 | PP/PLA | 90 | 10 | 0% | 6 × 6 | 130 | 155.56 | 48.9 | 1.9 | 0.75 |
| | | 90 | 10 | 0% | 6 × 6 | 145 | 89.25 | 19.44 | 1.66 | 0.74 |
| 12 | PP/PLA/ | 85 | 10 | 5% GMA-6 | 6 × 6 | 130 | 75.3 | 22.53 | 1.39 | 0.73 |
| | GMA-6 | 85 | 10 | 5% GMA-6 | 6 × 6 | 145 | 51.26 | 5.12 | 0.95 | 0.17 |

Referring to FIG. 9A, Sample 10 comprising an uncompatibilized PP/PLA blend at a 130° C. stretch temperature showed a large number of high amplitude broad non Gaussian peaks, 220 which tended to substantially overlap. This sample showed a higher degree of surface roughness when compared to the other samples. Additionally, Sample 10 also has the highest haze percentage at 130° C. However, it is interesting to notice that Sample 10 also has high gloss 45° at 130° C. This high haze coupled with high gloss behavior is unexpected as typically high haze is associated with low gloss and low haze is associated with high gloss. Sample 10 with high haze and high gloss at 130° C. results in a unique film appearance. When the films are rumpled, the appearance is similar to aluminum foils. Without wishing to be limited by theory, the high gloss may be related to the presence of PLA phases on the surface.

In comparison, Sample 12 which was a PP/PLA blend compatibilized with the reactive modifier GMA-6 when stretched at 130° C., FIG. 9B, tended to have a fewer number of peaks 230, that were generally Gaussian in appearance with lower amplitude indicating a smother surface. Without wishing to be limited by theory, the AFM results suggest that the compatibilized system in Sample 12 can be used for processes that require minimal surface roughness such as metallization processes.

AFM was conducted on Samples 10 and 12 stretched at 145° C. and the micrographs are shown in FIGS. 9C and 9D respectively. The results demonstrate that films prepared from the compatibilized blend (CB) also exhibited smoother surface than films prepared from uncompatibilized PP/PLA blends.

Example 6

A comparison study of contact angles between the BOPP film produced from polypropylene (PP) and a compatibilized PP/PLA blend were investigated. Three samples of cast film, cast sheets for BOPP, and BOPP films, designated Samples 16, 17, and 18, were prepared from polypropylene based resin, uncompatibilized PP/PLA blend, and compatibilized PP/PLA/PP-g-GMA-6, designated Sample 16, 17, and 18 respectively. The contact angle was obtained using DI water as the surface contact media in accordance with ASTM D5946. The results are tabulated in Table 17.

TABLE 17

| Sample | Contact Angle Results | PP | PP/PLA | PP/PLA/PP-g-GMA-6 |
|---|---|---|---|---|
| 16 | Cast Film | 106° | 102° | 102° |
| 17 | Cast Sheets for BOPP | 106° | 100° | 100° |
| 18 | BOPP Films | 107° | 106° | 106° |

The results demonstrate that the contact angles for polypropylene materials were approximately 106-107°. The oriented films do not show any improvement in surface tension in the presence of PLA. It is noticed that the compatibilized PP/PLA blend cast films exhibits a slightly lower contact angle, indicating that presence of PLA may have increased the surface tension of polypropylene cast films. However, a contact angle of over 100° means that the film surface tension is still much lower than water.

The effect of using different polypropylene homopolymers in the PP/PLA blend on the printability of films prepared from these blends was investigated. Five cast film samples, designated Samples 19 to 23 were prepared. Sample 19 was prepared using 3271 polypropylene homopolymer as the base resin. Samples 20 and 21 were uncompatibilized blends prepared using PPH5060 and MR2002 respectively as the base resin with 10% PLA. PPH5060 is a homopolymer polypropylene having a melt flow rate of 6 g/10 min. and MR2002 is a homopolymer polypropylene prepared with a metallocene catalyst having a melt flow rate of 15.0 g/10 min. Both PPH5060 and MR2002 are commercially available from Total Petrochemicals. Samples 22 and 23 were PP-g-GMA-3 and PP-g-GMA-6, produced and used as reactive modifiers in PP/PLA blends. The contact angles for these films were determined and tabulated in Table 18.

TABLE 18

| Sample | Cast Film | Contact Angle |
|---|---|---|
| 19 | PP | 106° |
| 20 | PPH5060/PLA | 90° |
| 21 | MR2002/PLA | 98° |
| 22 | PP-g-GMA-3 | 100° |
| 23 | PP-g-GMA-6 | 100° |

The results demonstrate that contact angle for all samples are similar. The contact angle for the PPH5060/PLA blend (Sample 20) was slightly lower than that observed for the MR2002/PLA blend (Sample 21) that was also slightly lower than the PP homopolymer (Sample 19). The contact angle for the cast films made from PP-g-GMA-3 (Sample 22) is the same as that of the PP-g-GMA-6 (Sample 23). Without wishing to be limited by theory, higher contact angle suggests lower surface tension, which is an indication that the film has good printability properties. Since the contact angles for these films were similar, the printability properties of these films are expected to be similar.

Example 7

Figure 10:
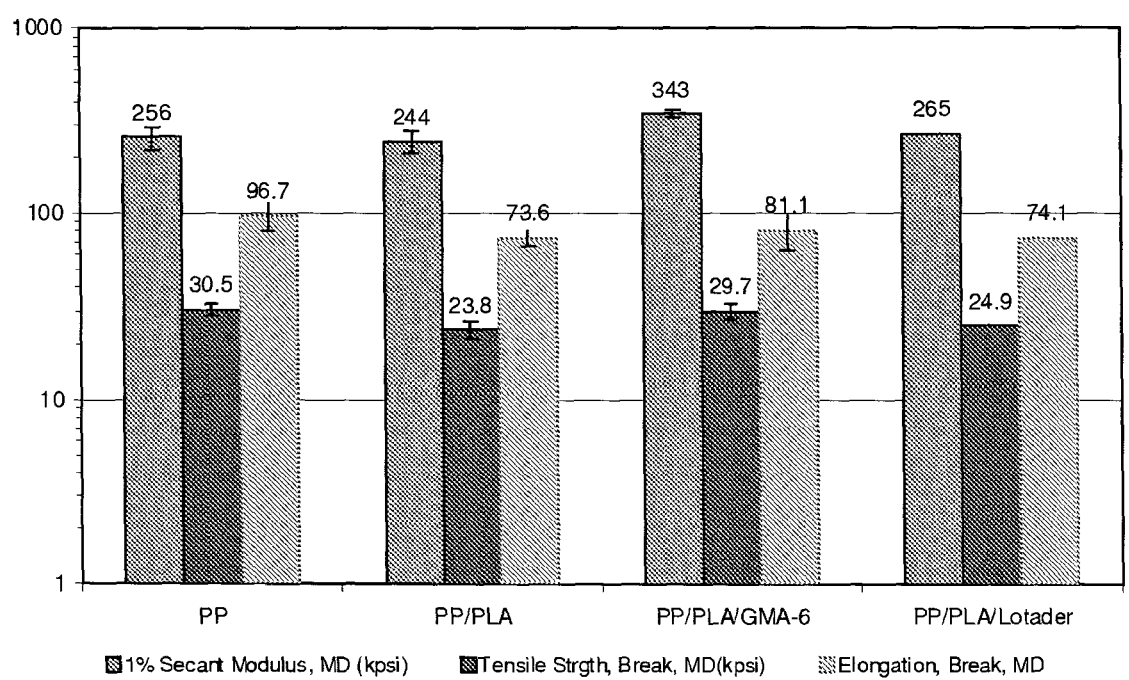
FIG. 10 is a plot of the secant modulus, tensile strength at break, and elongation at break for the samples from Example 2.

The mechanical properties of BOPP films prepared from CBs were investigated and compared to PP. The 1% secant modulus, tensile strength at break, and the elongation and break were determined in the machine direction (MD) for the samples from Example 3 and the results are tabulated in Table 19 and plotted in FIG. 10.

TABLE 19

| | PP 3271 | Sample 10 PP/PLA | Sample 12 PP/PLA/GMA-6 | Sample 13 PP/PLA/ Lotader |
|---|---|---|---|---|
| 1% Secant Modulus, MD (kpsi) | 256 | 244 | 343 | 265 |
| Tensile Strgth, Break, MD (kpsi) | 30.5 | 23.8 | 29.7 | 24.9 |
| Elongation, Break, MD | 96.7 | 73.6 | 81.1 | 74.1 |

Since PLA has a higher modulus than PP, the presence of PLA in films made from PP/PLA blend is expected to increase the stiffness of the film. However, referring to FIG. 10, films made from PP/PLA blend shows 1% secant modulus comparable to the polypropylene homopolymer. The BOPP films prepared using a PP/PLA blend and GMA-6 as a reactive modifier showed a 35% to 40% increase in the 1% secant modulus. Without wishing to be limited by theory, an explanation for this difference in performance may be the weak interfacial adhesion between PP and PLA phases in the uncompatibilized PP/PLA blend. This weak interfacial adhesion results in ineffective transfer of an applied load from the PP matrix to the stiffer PLA domains during solid state stretching.

Compatibilization effectively reinforces the interface, and the contribution of PLA to the material stiffness increases. Note that LOTADER is a polyethylene based modifier. While LOTADER appeared effective in reducing the haze as shown in Example 4, it causes only a slight increase in the modulus of the system. Without wishing to be limited by theory, the failure to reinforce the system in the solid state is believed to result from incompatibility between the PE and PP in the solid state offering further support of the importance of the interface between the PP and PLA in the GMA-6 compatibilized system.

Example 8

The tensile properties, flexural modulus and Izod impact of articles prepared from the polypropylene homopolymer 3271 was compared to those values for an article prepared from an uncompatibilized PP/PLA blend, a PP/PLA blend with the PP-g-GMA-6 compatibilizer, and a PP/PLA blend with the LOTADER compatibilizer for injection molded samples. The composition of PP/PLA and PP-g-GMA-6 contained 85 wt. % PP, 10 wt. % PLA, and 5 wt. % PP-g-GMA-6. The composition of PP/PLA and LOTADER contained 85 wt. % PP, 10 wt. % PLA, and 5 wt. % PP-g-GMA-6. The articles were ASTM specimens and prepared by injection molding in accordance with the previously referenced methodology. The results are tabulated in Table 20.

TABLE 20

| Parameters | PP | PP/10% PLA | PP/PLA/PP-g-GMA-6 | PP/PLA/ LOTADER |
|---|---|---|---|---|
| Tensile (ASTM) | | | | |
| Tensile Modulus (kpsi) | 220 | 236 | 250 | 227 |
| Yield Strength (psi) | 4630 | 4900 | 5200 | 4880 |
| Break Strength (psi) | 2360 | 1710 | 1770 | 1700 |
| Yield Elongation (%) | 9.2 | 6.4 | 6.1 | 7.2 |
| Break Elongation (%) | 50 | 46 | 85 | 229 |
| Flexural Modulus (kpsi) | 186 | 233 | 244 | 231 |
| Izod Impact (ft-lb/in) | 0.6 | 0.61 | 0.51 | 0.85 |

The results demonstrate that the PP/PLA blend compatibilized with GMA-6 displayed a higher stiffness, as evidenced by a higher tensile modulus, than the LOTADER-compatibilized and the non-compatibilized PP/PLA blends. Without wishing to be limited by theory, the high stiffness in GMA-6 compatiblized PP/PLA blend may be due to the reinforced PP/PLA interfaces in the GMA-6 compatibilized systems which takes maximum advantages of the stiffer PLA phases.

However, unlike BOPP films, for injection molded samples, the uncompatibilized PP/PLA blend and PP/PLA/ LOTADER blend possess higher stiffness than PP. Without wishing to be limited by theory, this observation may be due to compromise of the interfacial interface (by processes such as cavitation) during bi-axial orientation in BOPP films. For injection molded samples, the interfacial adhesion between PP and PLA remains intact, making it possible to take advantage of the high stiffness of PLA to a certain extent even in an uncompatibilized PP/PLA blend.

Example 9

The shrinkage at 125° C. and barrier properties at ambient temperature for BOPP films made from the blends of Example 8 were investigated and the results are tabulated in Table 21.

TABLE 21

| BOPP Films | PP | PP/PLA | PP/ PLA/ PP-g- GMA-6 | PP/PLA/ LOTADER |
|---|---|---|---|---|
| Stretch Temperatures | 135° C. | 135° C. | 145° C. | 135° C. | 135° C. |
| BOPP Thickness (mil) | 0.53 | 0.6 | 0.51 | 0.65 | 0.55 |
| OTR (cc/100 in2/day) | 231.5 | 181.7 | 197.8 | 165 | 178.9 |
| MD Shrinkage (%) | 10.6 | 11.8 | — | 10.7 | 12.5 |
| TD Shrinkage (%) | 10.6 | 11.7 | — | 10.3 | 12.8 |

From Table 21, the difference in shrinkage for BOPP films at 135° C. with and without PLA is minimal. A decrease in the oxygen barrier properties for the uncompatibilized PP/PLA blend, the PP/PLA compatibilized with PP-g-GMA-6, and the PP/PLA blend compatibilized with LOTADER was observed compared to PP. In addition, the uncompatibilized PP/PLA blend film stretched at 135° C. appeared to be relatively opaque compared to the one stretched at 145° C. which appeared to be relatively clear.

Example 10

Cavitation in BOPP films produced from the samples from Example 3 was investigated and compared to PP. Since cavitation relates to film density, the density of the films from Example 5 was determined and compared to the density of BOPP film prepared from polypropylene. The results are tabulated in Tables 22 and 23 and plotted in FIGS. 11 and 12.

TABLE 22

| | Stretch Temperature, ° C. | |
|---|---|---|
| | 135° C. | 145° C. |
| PP 3271 | 0.87 | 0.88 |

TABLE 22-continued

|  | Stretch Temperature, °C. | |
|---|---|---|
|  | 135° C. | 145° C. |
| Sample 10 PP/PLA | 0.81 | 0.87 |
| Sample 11 PP/PLA/GMA-3 | 0.84 | 0.89 |
| Sample 12 PP/PLA/GMA-6 | 0.88 | 0.9 |
| Sample 13 PP/PLA/Lotader | 0.89 | 0.89 |

TABLE 23

| Stretch Temperature, °C. | Sample 10 PP/PLA | Sample 11 PP/PLA/GMA3 | Sample 12 PP/PLA/GMA6 | Sample 13 PP/PLA/Lotader |
|---|---|---|---|---|
| 130 | 0.76 | 0.81 | 0.87 | 0.88 |
| 135 | 0.81 | 0.84 | 0.88 | 0.89 |
| 140 | 0.83 | 0.86 | 0.89 | 0.89 |
| 145 | 0.87 | 0.89 | 0.9 | 0.89 |
| 150 | 0.86 | 0.86 | 0.91 | 0.9 |

Figure 11:
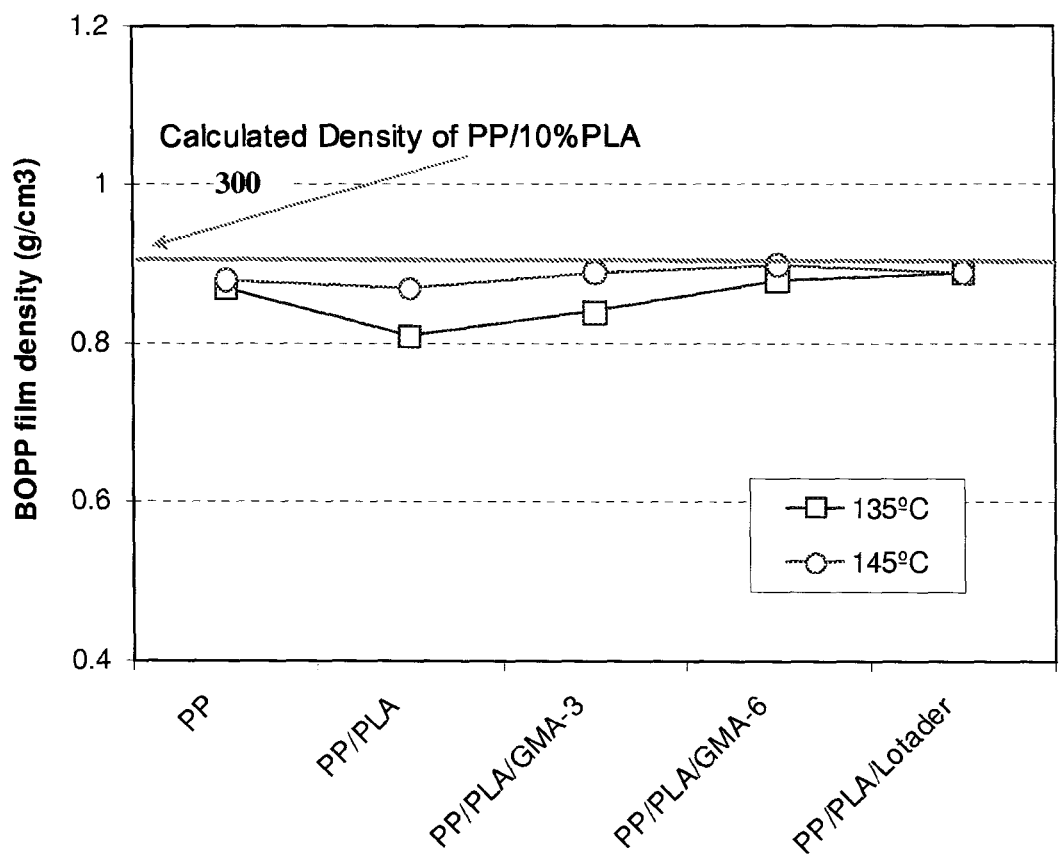
FIG. 11 is a plot of film density as a function of stretch temperature for the samples from Example 3.
Figure 12:
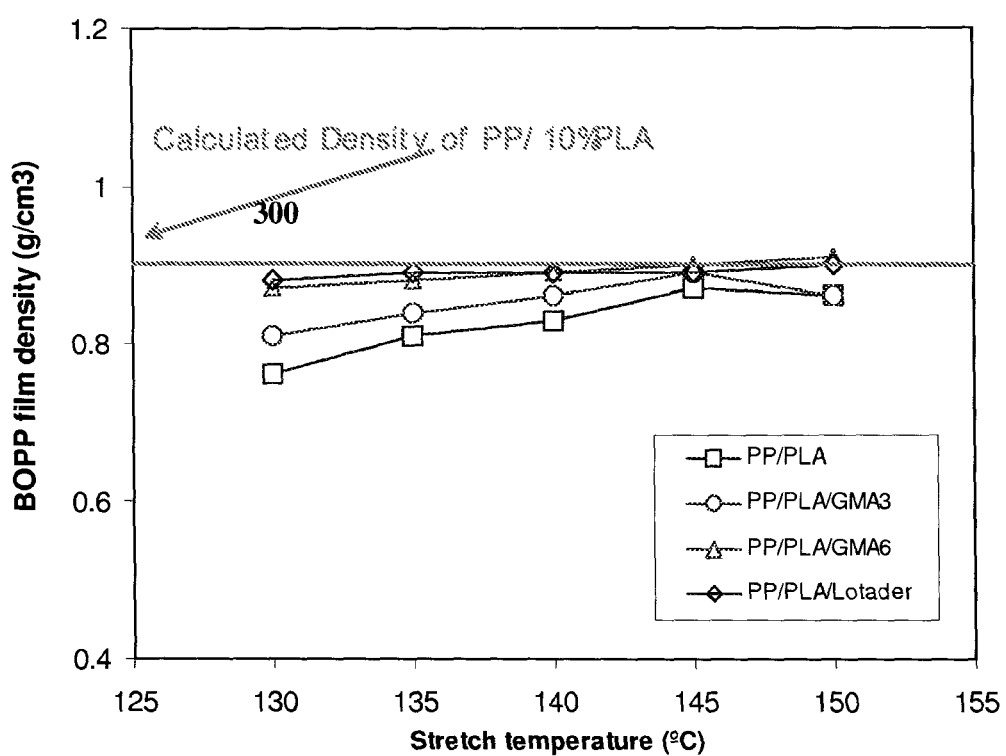
FIG. 12 is a plot of film density as a function of stretch temperature for compatibilized and uncompatibilized PP/PLA blends.

FIG. 11 is a plot of BOPP film density at stretch temperatures of 135° C. and 145° C. for a PP homopolymer Total Petrochemicals 3371 uncompatibilized and compatibilized PP/PLA blends, while FIG. 12 is a plot of film density as a function of stretch temperature. The expected density of a PP/PLA blend was calculated and is shown as reference line 300. The reference line was calculated using the following equation:

$$\Phi_{PP}\rho_{PP}+\Phi_{PLA}\rho_{PLA},$$

in which $\Phi$ and $\rho$ are the volume fraction and density of individual components in the blends, respectively. Referring to FIG. 11, polypropylene films stretched at both low and high temperatures appear to possess comparable film densities. However, the uncompatibilized PP/PLA blends resulted in films with lower densities than expected, suggesting the presence of voids in the films. A similar trend was observed when the samples were stretched in the temperature range from 130° C. to 150° C., FIG. 12. The compatibilized PP/PLA blends were found to have lesser degree of cavitation than uncompatibilized PP/PLA blends. Without wishing to be limited by theory, a high modulus dispersed phase is required to facilitate cavitation because it does not deform or orient along with the polypropylene matrix during bi-axial orientation, thus initiating the formation of voids at the matrix-particle boundaries. The results demonstrate that the use of reactive modifiers which form compatibilizers when reaction extruded with PP/PLA resulted in the formation of PP/PLA blends having reinforced interfaces. The presence of the reinforced interfaces retarded the formation of voids at the interfaces of a compatibilized PP/PLA blends.

Example 11

The density of BOPP films at a higher PLA amount was investigated. Three BOPP samples, designated Samples 14, 15, and 16, were prepared. Sample 14 was prepared from Total Petrochemicals polypropylene 3371, Sample 15 was prepared by blending 70% Total Petrochemicals polypropylene and 30% PLA 6201, and Sample 16 was prepared by blending 70% Total Petrochemicals polypropylene and 30% PLA 6201, and 3% Lotader. All samples were then stretched for bi-axial orientation using a Bruckner Karo IV at a stretch speed of 30 m/min and a simultaneous 6×6 draw ratio. However, Samples 15 and 16 could not be readily stretched as such conditions. The conditions were revised to a stretch speed of 3 m/min and a simultaneous 4×4 draw ratio. The stretching was carried out at a temperature range of from about 145° C. to about 155° C. The results are tabulated in Table 23 and shown in FIG. 13.

TABLE 23

| Stretch Temperature °C. | Sample 14 BOPP density, g/cc | Sample 15 BOPP density, g/cc | Sample 16 BOPP density, g/cc |
|---|---|---|---|
| 145 | 0.89 | 0.32 | 0.41 |
| 150 | 0.90 | 0.43 | 0.57 |
| 155 | 0.83 | 0.56 | 0.67 |

Figure 13:
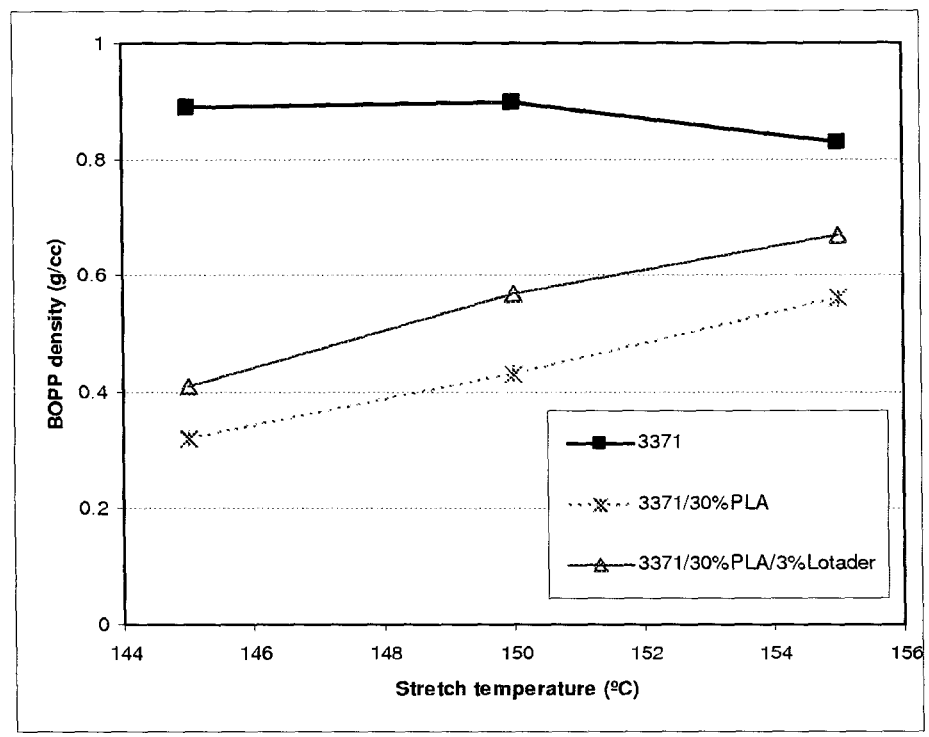
FIG. 13 is a plot of BOPP density as a function of stretch temperature for the samples from Example 11.

Without wishing to be limited by theory, the presence of larger amount of PLA lowered the stretching force, especially in the traverse direction, which was probably due to cavitation during stretching. FIG. 13 is a plot of BOPP density as a function of stretch temperature. Referring to FIG. 13, Sample 15, which was the uncompatibilized sample, was observed to have lower BOPP density when compared to Sample 14 and lower PLA amount (Sample 10) as shown in FIG. 12. Without wishing to be limited by theory, lower stretch temperatures, lower stretch speed, and/or lower draw ratio were more favorable for film cavitation, resulting in lower densities as observed in Sample 15.

Additionally, samples 15 and 16 appeared to be white and opaque with rough surface. Both samples 15 and 6 were further observed under an optical microscope and were found to have large pores.

While embodiments have been shown and described, modifications thereof can be made by one skilled in the art without departing from the spirit and teachings of the disclosure. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from 1 to 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k^* (R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. An article comprising:
a blend of polypropylene, polylactic acid, and glycidyl methacrylate grafted polypropylene;
wherein the glycidyl methacrylate grafted polypropylene is prepared by grafting glycidyl methacrylate onto polypropylene in the presence of an initiator and a multi-functional acrylate comonomer, and wherein the multi-functional acrylate comonomer comprises polyethylene glycol diacrylate or alkoxylated hexanediol diacrylate.

2. The article of claim 1, wherein the article is a blow-molded article, an extrusion article, injection blowmolded article, an injection stretch blowmolded article, or a thermoformed article.

3. The article of claim 1, wherein the article is a fiber.

4. The article of claim 1, wherein the article is an injection molded article.

5. The article of claim 4, wherein the article exhibits a tensile modulus of from 200 kpsi to 350 kpsi as determined in accordance with ASTM D638.

6. The article of claim 4, wherein the article exhibits a tensile strength at yield of from 4,000 psi to 6,000 psi as determined in accordance with ASTM D882.

7. The article of claim 4, wherein the article exhibits a flexural modulus of from 170 kpsi to 300 kpsi as determined in accordance with ASTM D790.

8. The article of claim 4, wherein the article exhibits a notched Izod impact strength of from 0.2 ft lb/in to 2.0 ft lb/in.

9. The article of claim 1, wherein the article is an oriented film.

10. The article of claim 9, wherein the oriented film is oriented in the machine direction, the transverse direction, or both.

11. The article of claim 9, wherein the oriented film exhibits a secant modulus of from 200 kpsi to 400 kpsi.

12. The article of claim 9, wherein the oriented film exhibits a tensile elongation at break of from 50% to 150%.

13. The article of claim 9, wherein the oriented film exhibits a tensile strength at break of from 20 kpsi to 40 kpsi.

14. The article of claim 1, wherein the glycidyl methacrylate grafted polypropylene has a grafting yield of from 0.2 wt. % to 15 wt. %.

15. The article of claim 14, wherein the polypropylene is present in an amount of from 51 wt. % to 99 wt. % based on a total weight of the blend, the polylactic acid is present in an amount of from 1 wt. % to 40 wt % based on the total weight of the blend, and the glycidyl methacrylate grafted polypropylene is present in an amount of from 0.5 wt. % to 15 wt. % based on the total weight of the blend.

16. The article of claim 1, wherein the multi-functional acrylate comonomer has a flash point of from 50° C. to 120° C.

17. The article of claim 1, wherein a ratio of GMA to multifunctional acrylate comonomer in the PP-g-GMA is from 1:5 to 10:1.

* * * * *